US007646789B2

(12) United States Patent
Umayabashi et al.

(10) Patent No.: US 7,646,789 B2
(45) Date of Patent: Jan. 12, 2010

(54) COMMUNICATION SYSTEM INCLUDING SEVERAL COMMUNICATION TERMINALS AND SERVER, ITS COMMUNICATION TERMINAL, ITS SERVER AND DATA TRANSFER CONTROL PROGRAM

(75) Inventors: Masaki Umayabashi, Tokyo (JP); Satomi Shioiri, Tokyo (JP); Kazuo Takagi, Tokyo (JP); Makoto Shibutani, Tokyo (JP)

(73) Assignee: NEC Corporation, Tokyo (JP)

( * ) Notice: Subject to any disclaimer, the term of this patent is extended or adjusted under 35 U.S.C. 154(b) by 1445 days.

(21) Appl. No.: 10/352,114

(22) Filed: Jan. 28, 2003

(65) Prior Publication Data

US 2003/0142693 A1 Jul. 31, 2003

(30) Foreign Application Priority Data

Jan. 29, 2002 (JP) .............................. 2002-020593

(51) Int. Cl.
*H04J 3/16* (2006.01)
(52) U.S. Cl. ....................................... 370/467; 370/537
(58) Field of Classification Search ........................ None
See application file for complete search history.

(56) References Cited

U.S. PATENT DOCUMENTS

| 4,626,826 | A | * | 12/1986 | Fukuda et al. ................. 341/58 |
| 5,304,996 | A | * | 4/1994 | Hsu et al. ...................... 341/95 |
| 5,387,911 | A | * | 2/1995 | Gleichert et al. ............... 341/95 |
| 5,577,069 | A | * | 11/1996 | Lau et al. ..................... 375/242 |
| 5,699,061 | A | * | 12/1997 | Shimpuku ..................... 341/59 |
| 6,351,768 | B1 | * | 2/2002 | Alldread et al. ............. 709/224 |
| 6,457,140 | B1 | * | 9/2002 | Lindberg et al. ............... 714/6 |
| 6,496,516 | B1 | * | 12/2002 | Dabecki et al. ............. 370/460 |
| 6,496,540 | B1 | * | 12/2002 | Widmer ....................... 375/242 |
| 2001/0024457 | A1 | * | 9/2001 | Barry et al. .................. 370/537 |
| 2002/0171895 | A1 | * | 11/2002 | Chang ......................... 359/168 |
| 2003/0137975 | A1 | * | 7/2003 | Song et al. ................... 370/353 |
| 2003/0179769 | A1 | * | 9/2003 | Shi et al. ..................... 370/442 |

FOREIGN PATENT DOCUMENTS

| CA | 2 255 418 A1 | 6/2000 |
| JP | 2-020149 A | 1/1990 |
| JP | 5-327751 A | 12/1993 |
| WO | WO 01/93498 A2 | 12/2001 |

* cited by examiner

*Primary Examiner*—Phuc H Tran
(74) *Attorney, Agent, or Firm*—Sughrue Mion, PLLC

(57) ABSTRACT

In a communication system in which a plurality of communication terminals sequentially transfer data to a server during the respective transmission permissible periods assigned to the respective communication terminals, the communication terminal transfers a preamble for synchronization to the server at a time of starting the transmission permissible period, converts a data frame for every 8 bits into every 10 bit-code, and transmits to the server, the signal string with a code indicating the head added there, during the transmission permissible period, and turns a communication to the server into a zero signal state, during a period other than the transmission permissible period, while the server establishes a synchronization by reading the preamble for synchronization inserted into the signal string received from each of the communication terminals, converts a portion of the zero signal state of the signal string into a predetermined special code string, and inversely transforms the received signal string into the data frame before the coding.

41 Claims, 27 Drawing Sheets

COMMUNICATION SYSTEM INCLUDING SEVERAL COMMUNICATION TERMINALS AND SERVER, ITS COMMUNICATION TERMINAL, ITS SERVER AND DATA TRANSFER CONTROL PROGRAM

BACKGROUNDS OF THE INVENTION

1. Field of the Invention

The present invention relates to communication between a plurality of communication terminals and a server, and more particularly to a communication system in which a plurality of communication terminals sequentially transfer data to a server during a transmission permissible period assigned to each of the communication terminals, the communication terminal, the server, and the data transfer control program.

2. Description of the Related Art

Recently, a demand for speeding up a network at a lower cost is increasing with prevalence of a multi-media communication service including sound, image, and Internet. The demand is increasing not only in a basic network but also in a subscriber access network, and application of the Ethernet (R) technique which has been developed as the LAN technique, to a public network, especially to a subscriber access network, is advanced.

FIG. 38 is a view showing the structure of the E-SS (Ethernet(R)-Single Star) system by way of example in the case of applying the Ethernet (R) technique to a subscriber access network.

An E-SS system 100 of FIG. 38 comprises optical network units (communication terminals) 110 to 112 respectively connected through fibers (optical fibers) 140 to 142 and optical line termination (server) 120. Client devices 150 to 152 are respectively connected to the optical network units 110 to 112, and a local switch 160 is connected to the optical line termination 120, which is connected to a metro network through the local switch 160. A point-to-point connection is established between the respective optical network units 110 to 112 and the optical line termination 120 through the respective fibers 140 to 142.

Each of the optical network units 110 to 112 comprises a MAC processing unit 113, an 8B10B coding unit 115, a signal serializing unit 116, and a physical interface 117. The optical line termination 120 comprises a MAC processing unit 123 and physical layer processing units 130 to 132 each consisting of an 8B10B decoding unit 125, a signal paralleling unit 126, and a physical interface 127.

For the sake of easy description, there show only the respective function units concerned about the upstream data transfer from the optical network units 110 to 112 to the optical line termination 120.

There are a lot of cases of using the gigabit Ethernet(R) of the full-duplex mode for the fibers 140 to 142, according to the demand for speeding up and the restriction of the arrival distance.

In the E-SS system 100 in the case of following the definition of IEEE 802.3, a frame is transferred as follows from the optical network units 110 to 112 to the optical line termination 120.

Upon receipt of MAC frames from the client devices 150 to 152, the MAC processing unit 113 processes their addresses and transfers the frames to the 8B10B coding unit 115.

The 8B10B coding unit 115 encodes the received MAC frames in order to restrain the deterioration of the signals on a transmission channel. More specifically, as for the MAC frame, the data for every 8 bits is converted into each code of 10 bits including 1 and 0 half and half. The data string converted into 10 bit-code is transferred to the signal serializing unit 116.

The signal serializing unit 116 converts the code string for every 10 bit into a serial signal and transfers it to the physical interface 117. The physical interface 117 transfers the received serial signal string to the fiber 140.

The serial signal string is transferred to the physical interface 127 of the physical layer processing unit 130 of the optical line termination 120, through the fiber 140. The physical interface 127 transfers the received signal string to the signal paralleling unit 126. The signal paralleling unit 126 converts the serial signal string into parallel code strings for every 10 bits, and transfers the same to the 8B10B decoding unit 125. The 8B10B decoding unit 125 decodes the code strings for every 10 bits to the data for every 8 bits.

The decoded MAC frames are transferred to the MAC processing unit 123. The MAC processing unit 123 processes the addresses of the received MAC frames and transfers the same to the local switch 160.

In this way, in the E-SS system 100 having a point-to-point connection between the respective optical network units 110 to 112 and the optical line termination 120, upon receipt of the MAC frames from the respective client devices 150 to 152, the respective optical network units 110 to 112 transfer the received frames to the optical line termination 120 sequentially, thereby transfer the frames in an upstream direction.

As a subscriber access network capable of reducing the cost more than the E-SS system 100 of FIG. 38, the EPON (Ethernet(R)-PON) system of the point-to-multipoint PON structure receives much attention.

FIG. 39 is an outline of the conventional EPON system 200. In the EPON system 200 of FIG. 39, each optical network unit 210 to 212 is designed to have a MAC control unit 114 in addition to the structure of each optical network unit 110 to 112. Further, the optical line termination 220 is designed to have a MAC control unit 124 in addition to the structure of the optical line termination 120 of FIG. 38, and the physical layer processing units 130 to 132 corresponding to the respective optical network units in FIG. 38 are integrated into one physical layer processing unit 130.

The EPON system 200 is different from the E-SS system 100 in that a point-to-multipoint connection is established between the respective optical network units 210 to 212 and the optical line termination 220. Namely, by providing a passive signal combining/separating unit 230 on a communication channel, the respective optical network units 210 to 212 are connected to the passive signal combining/separating unit 230 through the respective fibers (optical fibers) 140 to 142 in a multipoint way, and the passive signal combining/separating unit 230 is connected to the optical line termination 220 through a shared fiber 240.

Constituted as mentioned above, the EPON system 200 can share the physical layer processing unit 130 of the optical line termination 220 among the several optical network units 210 to 212, thereby saving the cost.

In the EPON system 200, in order to avoid a signal collision in the passive signal combining/separating unit 230 within the shared fiber 240 of the optical line termination 220 shared by the optical network units 210 to 212, the MAC control unit 124 of the optical line termination 220 makes the respective optical network units 210 to 212 execute the data transfer to the optical line termination 220 within the respective frame transmission permissible periods previously assigned, thereby controlling the upstream frame transmission.

The above-mentioned EPON system 200, however, has the following problems as for the frame transfer, although it has the physical structure capable of saving the cost.

If the conventional EPON system 200 follows the IEEE 802.3, it is necessary for the respective optical network units (communication terminals) 210 to 212 to transmit a signal during a period other than the frame transmission permissible period previously assigned. Therefore, in the passive signal combining/separating unit 230, signals from the respective optical network units 210 to 212 always collide with each other and the optical line termination (server) 220 cannot receive the correct signals.

FIG. 40 and FIG. 41 are signal strings to be transferred by the EPON system 200. The signal string 300 shown in FIG. 40 is a signal string to be transferred from the MAC processing unit 113 to the 8B10B coding unit 115.

The signal string 300 consists of MAC frames 330 to 332, preambles 340 to 342 respectively added to the MAC frames 330 to 332, and inter-packet gaps (Inter Packet Gap: IPG) 350 and 351 interposed between the respective MAC frames 330 to 332, and the signal string 300 is transferred during the frame transmission permissible period.

The signal string 300 is converted into the signal string 310 by the 8B10B coding unit 115. In the signal string 310, the portion from the preamble 342 to the MAC frame 330 of the signal string 300 becomes the 8B10B coding signal 370, and a START signal 360 is added to the signal. Idle signals 371 and 372 are transferred to the non-transmission portion of the signal string 300.

In these ways, since signals (idle signals 371 and 372) are transmitted from the respective optical network units 210 to 212 also during the period other than the frame transmission permissible period, the signals from the respective optical network units 210 to 212 collide in the passive signal combining/separating unit 230, and therefore, the optical line termination 220 cannot receive correct signals.

Further, in the conventional EPON system, as mentioned above, since the signals collide in the passive signal combining/separating unit, correct signals cannot be received in the optical line termination, and further, synchronization cannot be taken for a short period in the physical interface 127 of the optical line termination 220 because the preamble (EPON preamble for synchronization) is coded by the 8B10B coding unit 115 in the EPON system 200, thereby deteriorating the transfer efficiency.

Namely, the signal string 300 is 8B10B-encoded and converted into the signal string 310 shown in FIG. 41. In the signal string 310, a bit pattern [1010101010 . . . ] no longer exists, by 8B10B-encoding the preambles 340 to 342 of the signal string 300. Therefore, synchronization cannot be taken for a short period in the physical interface 127 of the optical line termination 220.

SUMMARY OF THE INVENTION

In order to solve the defects of the above conventional technique, a first object of the present invention is to provide a communication system of Ethernet(R)-PON method in which a server (optical line termination) can correctly receive the signals from the respective communication terminals (optical network units), the communication terminal, the server, and the data transfer controlling program.

In order to solve the defects of the above conventional technique, a second object of the present invention is to provide a communication system of Ethernet(R)-PON method in which a server (optical line termination) can synchronize the signals from the respective communication terminals (optical network units) for a short time, thereby improving the efficiency of the data transfer, the communication terminal, the server, and the data transfer control program.

According to one aspect of the invention, a communication system in which a plurality of communication terminals sequentially transfer data to a server during each transmission permissible period assigned to the communication terminals, wherein the communication terminal converts a data frame for every predetermined bit into a code of bit number, that is different depending on the predetermined bit, so to transmit the same code to the server, during the transmission permissible period, and transmits a repeated bit string of a specified bit to the server, during a period other than the transmission permissible period, while the server obtains the data frame, by inversely transforming the coding, after converting the repeated bit string included in the communication bit string received from the communication terminal into a special code string indicating a predetermined idle state of zero signal.

In the preferred construction, the coding in the communication terminal is to convert the data frame for every 8 bits into every 10 bit-code, and the special code string is a bit string of "0011111010" and "1010010110".

In another preferred construction, the coding in the communication terminal is to convert the data frame for every 8 bits into every 10 bit-code, and the special code string is a bit string of "0011111010" and "0110110101".

In another preferred construction, the communication terminal adds a preamble for synchronization to a head of a signal string obtained by coding the data frame, at a time of starting the transmission permissible period, hence to transmit the same to the server, while the server establishes a synchronization by reading the preamble for synchronization.

In another preferred construction, the communication terminal adds a second preamble for creating a preamble for synchronization through the coding to the data frame before the coding, at a time of starting the transmission permissible period, codes a signal string by placing the preamble for synchronization obtained by coding the second preamble before a code indicating a head of a frame obtained by coding the data frame, and transmits the coded signal string to the server, while the server establishes a synchronization by reading the preamble for synchronization.

In another preferred construction, the second preamble includes a bit string of repeating "10110101".

In another preferred construction, the communication terminal adds a preamble for synchronization to the data frame before the coding, at a time of starting the transmission permissible period, codes a signal string by placing a third preamble obtained by coding the preamble for synchronization before a code indicating a head of a frame obtained by coding the data frame, and transmits the coded signal string to the server after converting the third preamble into the preamble for synchronization, while the server establishes a synchronization by reading the preamble for synchronization.

In another preferred construction, the preamble for synchronization includes a bit string of repeating "1010101010".

In another preferred construction, the server transmits a control signal for instructing a stop of data transfer to the respective communication terminals, according to the transmission permissible periods respectively assigned to the communication terminals.

In another preferred construction, the server transmits a control signal for instructing a start of data transfer to the respective communication terminals, according to the transmission permissible periods respectively assigned to the communication terminals.

In another preferred construction, data is transferred between the respective communication terminals and the server, by using an Ethernet (R) frame.

According to the second aspect of the invention, a communication system in which a plurality of communication terminals sequentially transfer data to a server during each transmission permissible period assigned to the communication terminals, wherein the communication terminal converts a data frame for every predetermined bit into a code of bit number, that is different depending on the predetermined bit, so to transmit the same code to the server, during the transmission permissible period, and turns off a signal for transmitting the data frame, during a period other than the transmission permissible period, while the server obtains the data frame, by inversely transforming the coding, after converting a portion of turning off the signal in the communication terminal, included in the communication bit string received from the communication terminal, into a predetermined special code string indicating an idle state of zero signal.

According to the third aspect of the invention, a communication terminal for transferring data to a server during an assigned transmission permissible period, comprises means for converting a data frame for every predetermined bit into a code of bit number, that is different depending on the predetermined bit, so to transmit the same code to the server, during the transmission permissible period, and means for transmitting a repeated bit string of a specified bit to the server, during a period other than the transmission permissible period.

According to another aspect of the invention, a communication terminal for transferring data to a server during an assigned transmission permissible period, comprises means for converting a data frame for every predetermined bit into a code of bit number, that is different depending on the predetermined bit, so to transmit the same code to the server, during the transmission permissible period, and means for turning off a signal for transmitting the data frame, during a period other than the transmission permissible period.

In the preferred construction, the coding is to convert the data frame for every 8 bits into every 10 bit-code, and the special code string is a bit string of "0011111010" and "1010010110".

In another preferred construction, the coding is to convert the data frame for every 8 bits into every 10 bit-code, and the special code string is a bit string of "0011111010" and "0110110101".

In another preferred construction, the communication terminal comprises means for adding a preamble for synchronization on the server to a head of a signal string obtained by coding the data frame, at a time of starting the transmission permissible period, so to transmit the same signal string to the server.

In another preferred construction, the communication terminal comprises means for adding a second preamble for creating a preamble for synchronization through the coding to the data frame before the coding, at a time of starting the transmission permissible period, wherein the coding means creates a signal string to be transmitted to the server by placing the preamble for synchronization obtained by coding the second preamble before a code indicating a head of a frame obtained by coding the data frame.

In another preferred construction, the second preamble includes a bit string of repeating "10110101".

In another preferred construction, the communication terminal comprises means for adding a preamble for synchronization to the data frame before the coding at a time of starting the transmission permissible period, wherein the coding means places a third preamble obtained by coding the preamble for synchronization before a code indicating a head of a frame obtained by coding the data frame, and creates a signal string to be transmitted to the server, by converting the third preamble into the preamble for synchronization.

In another preferred construction, the preamble for synchronization includes a bit string of repeating "1010101010".

In another preferred construction, the communication terminal comprises means for temporarily storing the data frame during the transmission permissible period and transmitting the stored data frame to the server within the transmission permissible period.

According to another aspect of the invention, a server for sequentially receiving data from a plurality of communication terminals during a transmission permissible period assigned to each of the communication terminals, comprises means for receiving a communication bit string obtained by converting a data frame for every predetermined bit into a code of bit number, that is different depending on the predetermined bit, from the communication terminal, and means for obtaining the data frame, by inversely transforming the coding, after converting a repeated bit string included in the received communication bit string into a predetermined special code string indicating an idle state of zero signal.

According to another aspect of the invention, a server for sequentially receiving data from a plurality of communication terminals during a transmission permissible period assigned to each of the communication terminals, comprises means for receiving a communication bit string obtained by converting a data frame for every predetermined bit into a code of bit number, that is different depending on the predetermined bit, from the communication terminal, and means for obtaining the data frame, by inversely transforming the coding, after converting a portion of turning off a signal for transmitting data in the communication terminal, included in the received communication bit string, into a predetermined special code string indicating an idle state of zero signal.

In the preferred construction, the coding in the communication terminal is to convert the data frame for every 8 bits into every 10 bit-code, and the special code string is a bit string of "0011111010" and "1010010110".

In another preferred construction, the coding in the communication terminal is to convert the data frame for every 8 bits into every 10 bit-code, and the special code string is a bit string of "0011111010" and "0110110101".

In another preferred construction, the server fixedly assigns the respective transmission permissible periods to the respective communication terminals at each period previously determined in every communication terminal.

In another preferred construction, the server dynamically assigns the respective transmission permissible periods to the respective communication terminals, according to arrival status of data transfer from the respective communication terminals.

In another preferred construction, the server dynamically assigns the respective transmission permissible periods to the respective communication terminals, according to assignment requests of the transmission permissible periods transferred from the respective communication terminals.

In another preferred construction, the server transmits a control signal for instructing a stop of data transfer to each of the communication terminals, according to the transmission permissible period assigned to each of the communication terminals.

In another preferred construction, the server transmits a control signal for instructing a start of data transfer to each of the communication terminals, according to the transmission permissible period assigned to each of the communication terminals.

According to another aspect of the invention, a data transfer control program for controlling a frame transmission of a communication terminal for transferring data to a server during an assigned transmission permissible period, by controlling a computer, comprising the following functions of converting a data frame for every predetermined bit into a code of bit number, that is different depending on the predetermined bit, so to transmit the same code to the server, during the transmission permissible period, and transmitting a repeated bit string of a specified bit to the server, during a period other than the transmission permissible period.

According to a further aspect of the invention, a data transfer control program for controlling a frame transmission of a communication terminal for transferring data to a server during an assigned transmission permissible period, by controlling a computer, comprising the following functions of converting a data frame for every predetermined bit into a code of bit number, that is different depending on the predetermined bit, so to transmit the same code to the server, during the transmission permissible period, and turning off a signal for transmitting data during a period other than the transmission permissible period.

According to a still further aspect of the invention, a data transfer control program for controlling a frame transmission of a plurality of communication terminals by controlling a server for sequentially receiving data from the communication terminals during a transmission permissible period assigned to each of the communication terminals, comprising the following functions of receiving a communication bit string obtained by converting a data frame for every predetermined bit into a code of bit number, that is different depending on the predetermined bit, from the communication terminal, and obtaining the data frame, by inversely transforming the coding, after converting a repeated bit string included in the received communication bit string into a predetermined special code string indicating an idle state of zero signal.

Other objects, features and advantages of the present invention will become clear from the detailed description given herebelow.

BREIF DESCRIPTION OF THE DRAWINGS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
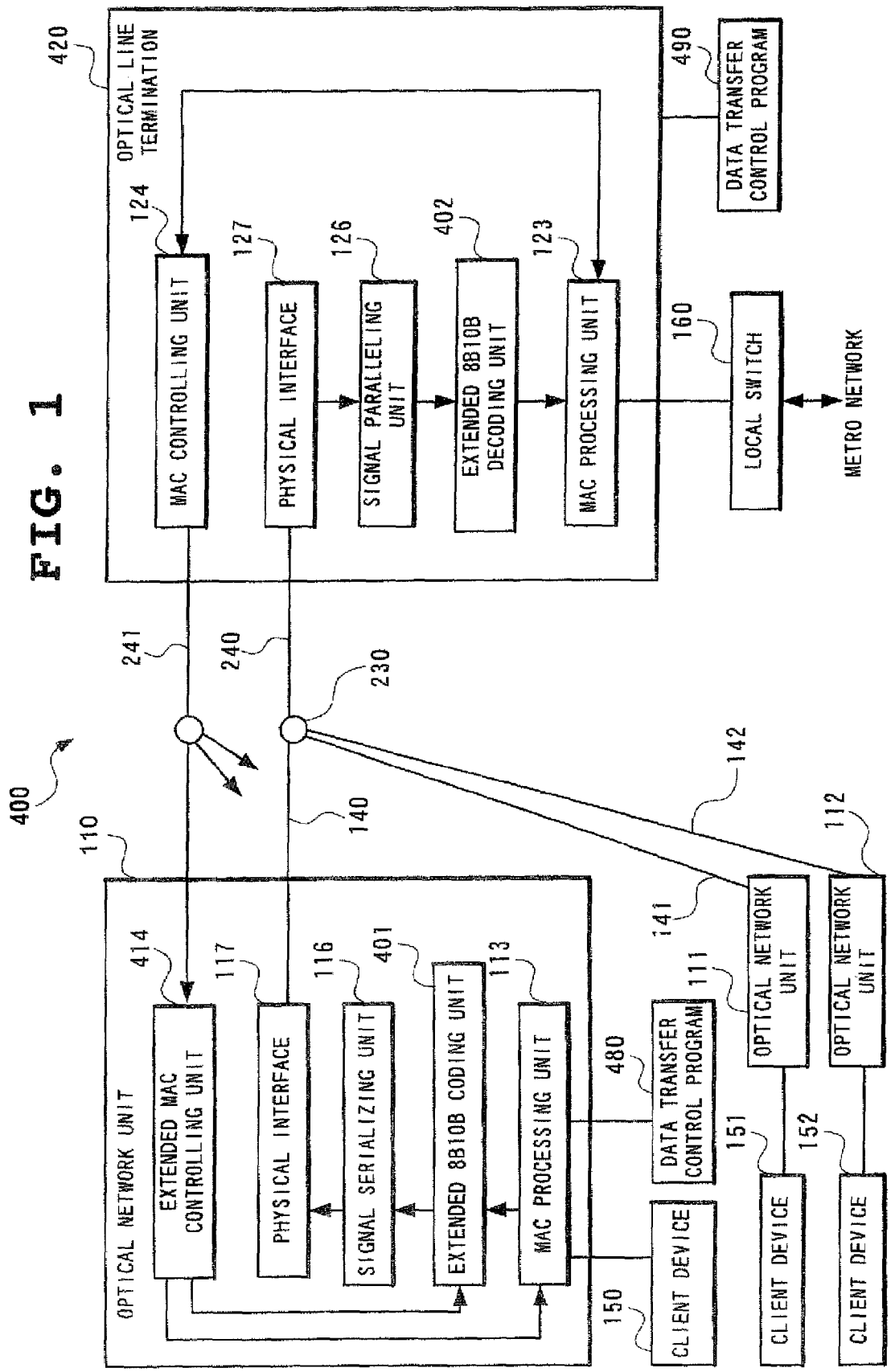
FIG. 1 is a block diagram showing the structure of the EPON system according to a first embodiment of the present invention.

FIG. 1 is a block diagram showing the structure of an EPON system (communication system) 400 according to a first embodiment of the present invention.

The EPON system 400 of this embodiment is constituted in a point-to-multipoint connection between the respective optical network units 110 to 112 and the optical line termination 420 through the respective fibers 140 to 142 and the shared fiber 240, as illustrated in FIG. 1. Namely, a multipoint connection is applied between the respective optical network units 410 to 412 and the passive signal combining/separating unit 230 through the respective fibers (optical fibers) 140 to 142, and the shared fiber 240 connects the passive signal combining/separating unit 230 and the optical line termination 220.

Figure 3:
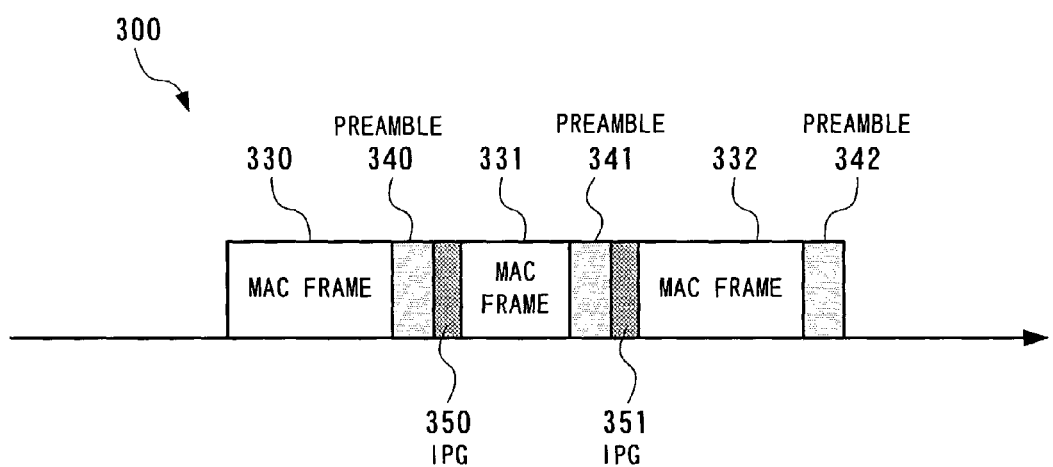
FIG. 3 is a view showing a signal string according to the first embodiment of the present invention.
Figure 4:
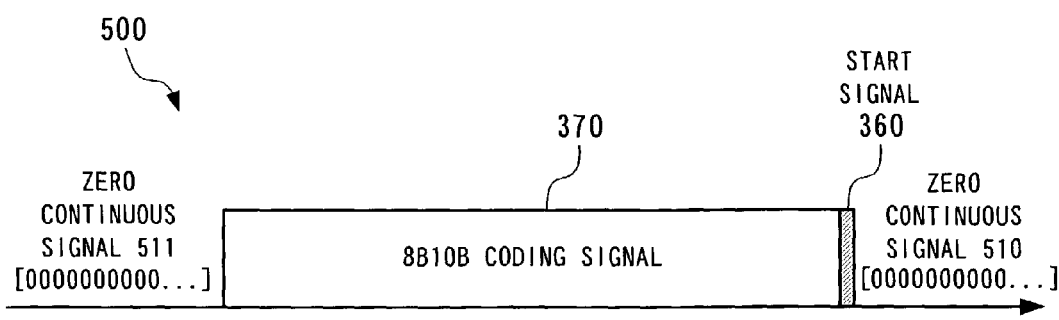
FIG. 4 is a view showing a signal string according to the first embodiment of the present invention.
Figure 39:
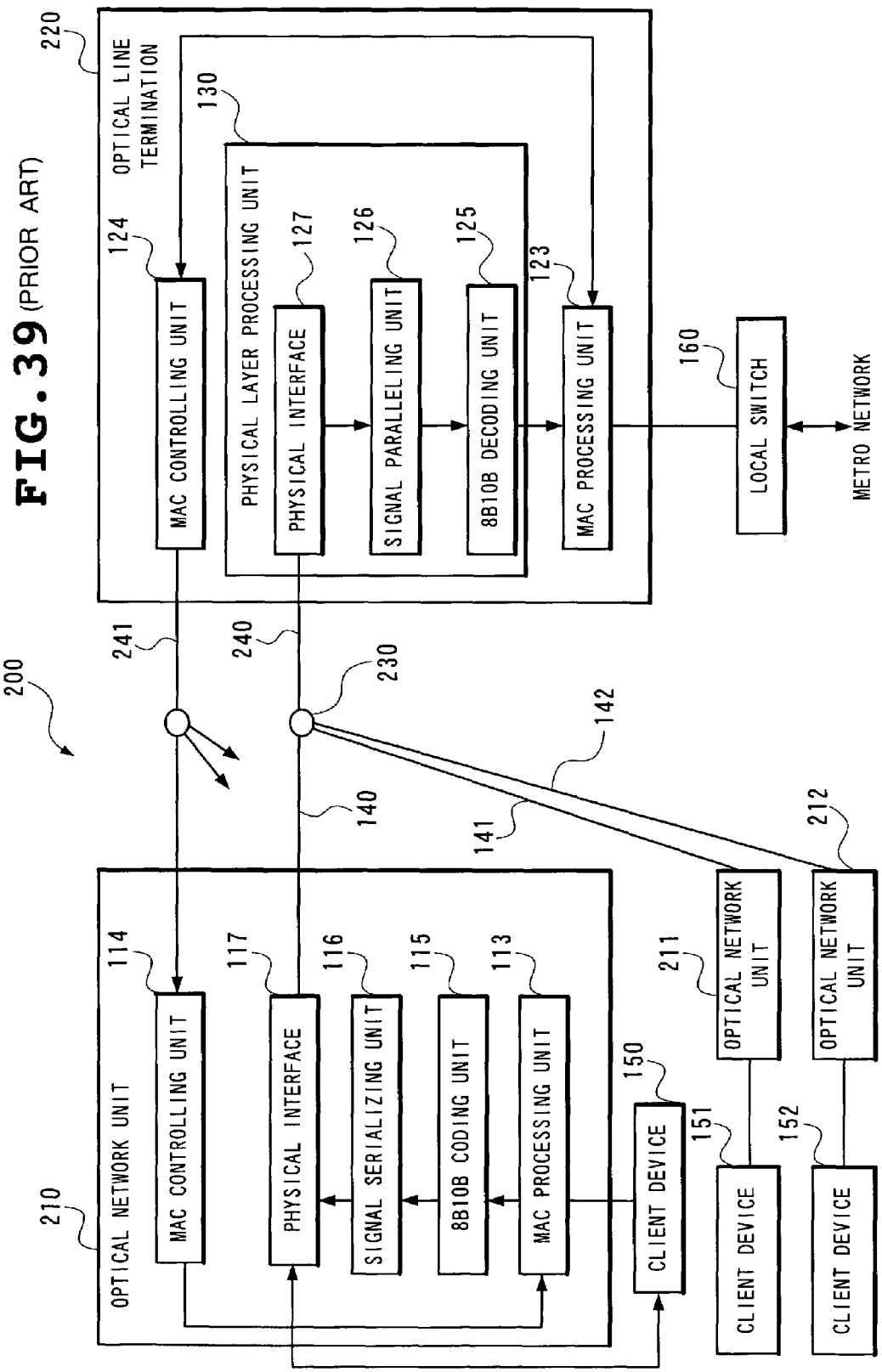
FIG. 39 is a block diagram showing the structure of the conventional EPON system.
Figure 40:
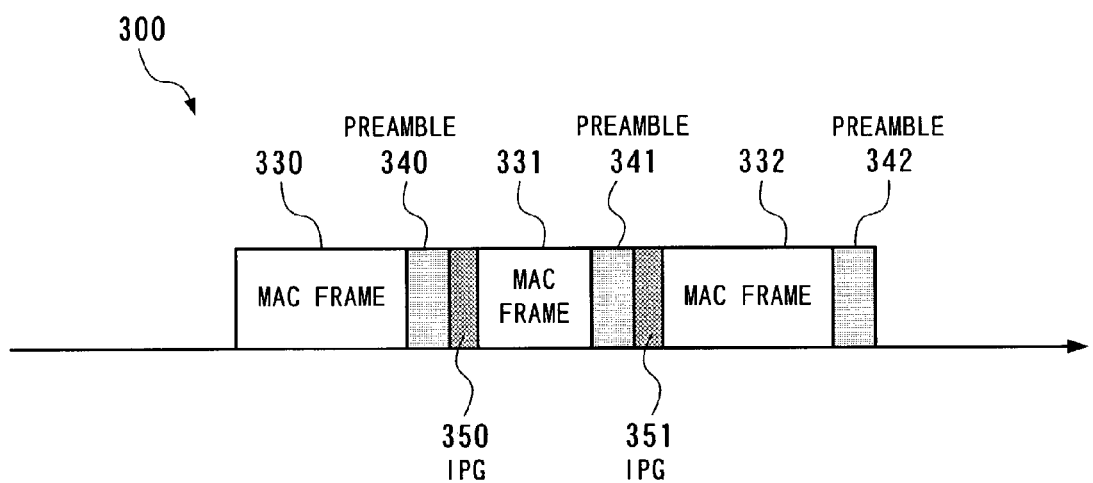
FIG. 40 is a view showing a signal string in the conventional EPON system.
Figure 41:
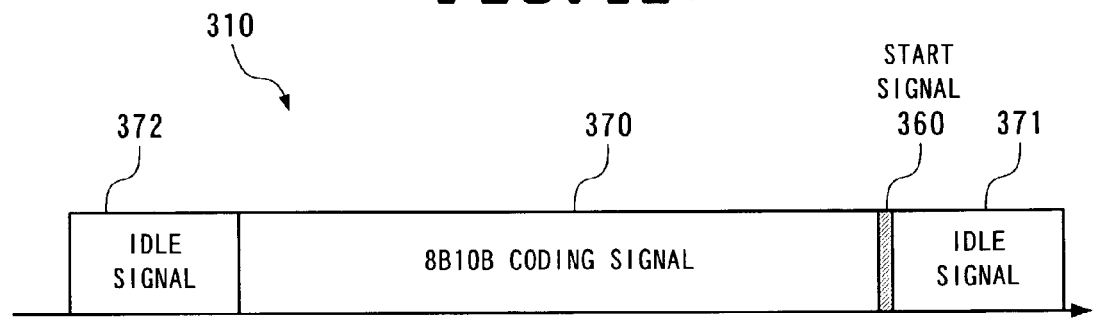
FIG. 41 is a view showing a signal string in the conventional EPON system.

Instead of the 8B10B coding unit 115 and the MAC controlling unit 114 of each of the optical network units 210 to 212 of the conventional EPON system 200 in FIG. 39, each of the optical network units 410 to 412 of the EPON system 400 is newly provided with an extended 8B10B coding unit 401 and an extended MAC controlling unit 414. Further, in an optical line termination 420, instead of the 8B10B decoding unit 125 of each of the conventional optical line terminations 210 to 212, an extended 8B10B decoding unit 402 is newly provided. FIG. 3 and FIG. 4 show each signal string to be transferred between each portion of the EPON system 400 of this embodiment.

Figure 2:
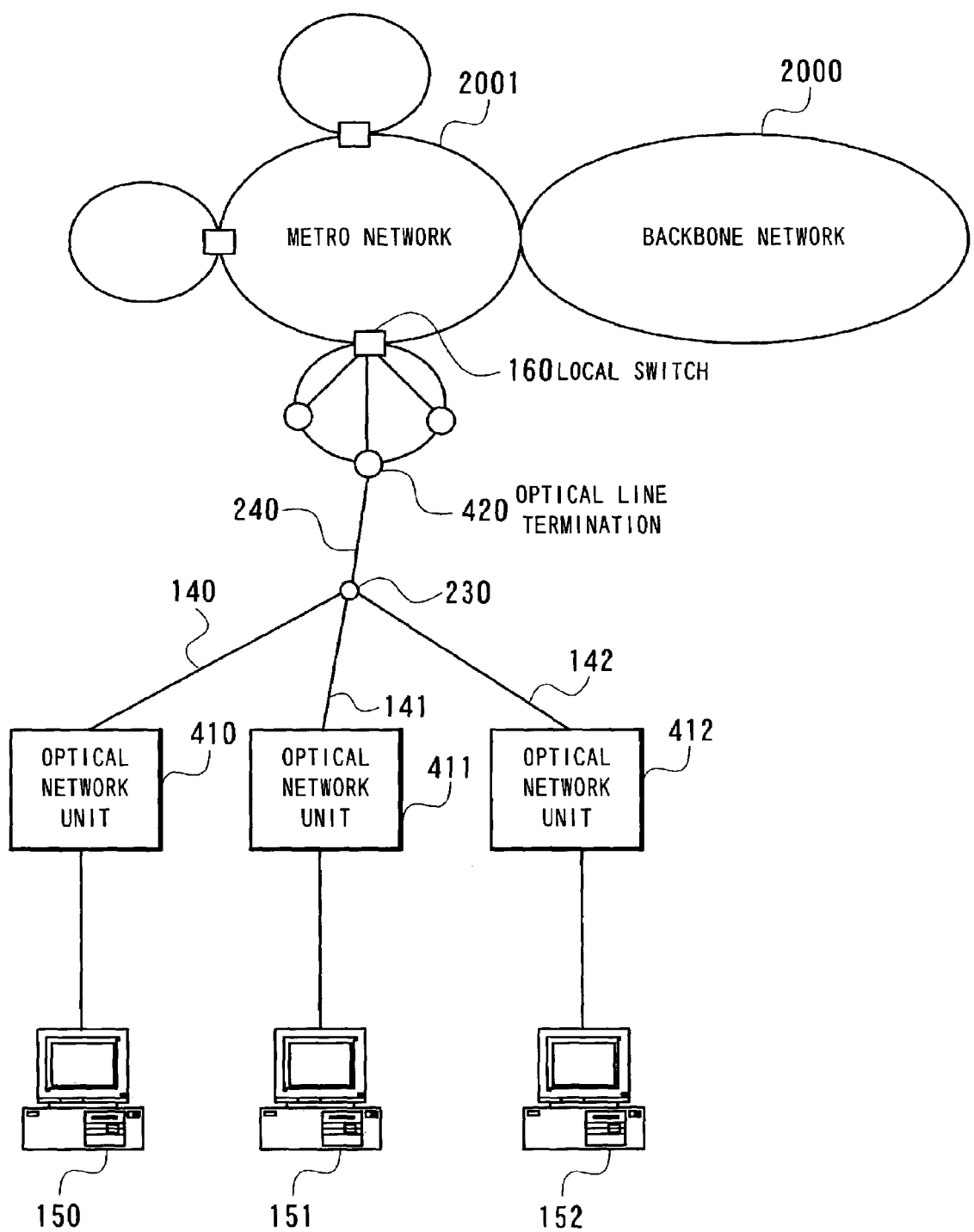
FIG. 2 is a view showing an example of a network system to which the EPON system according to the first embodiment of the present invention is adopted.

FIG. 2 shows an example of a network system to which the EPON system 400 of this embodiment is applied, and the EPON system 400 is connected to a metro network 2001 connected to the Backbone network 2000, through a local switch 160.

Figure 5:
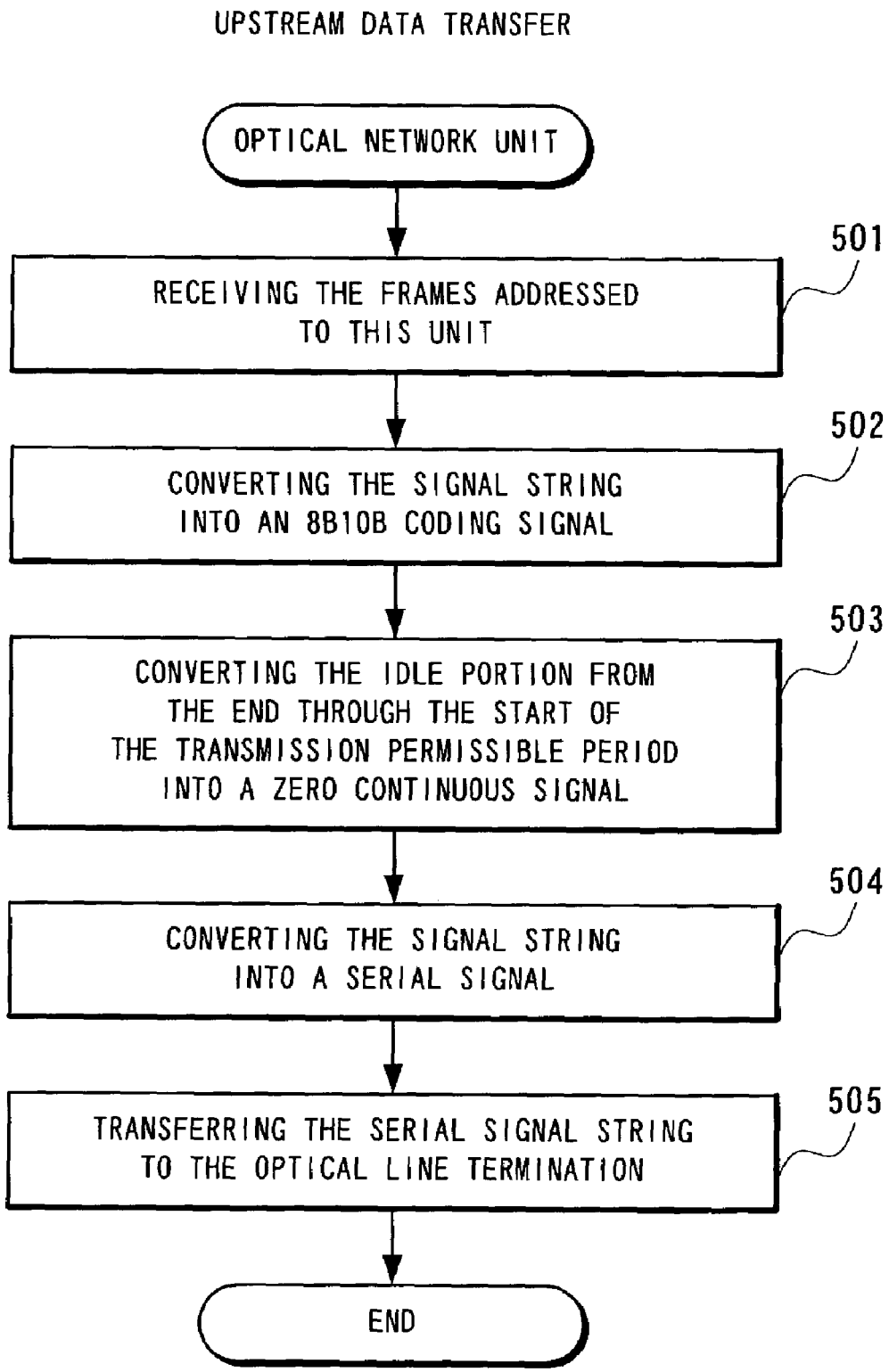
FIG. 5 is a flow chart for use in describing the processing of the data transfer of the EPON system according to the first embodiment, and especially, the operation of the optical network unit in the upstream data transfer.
Figure 6:
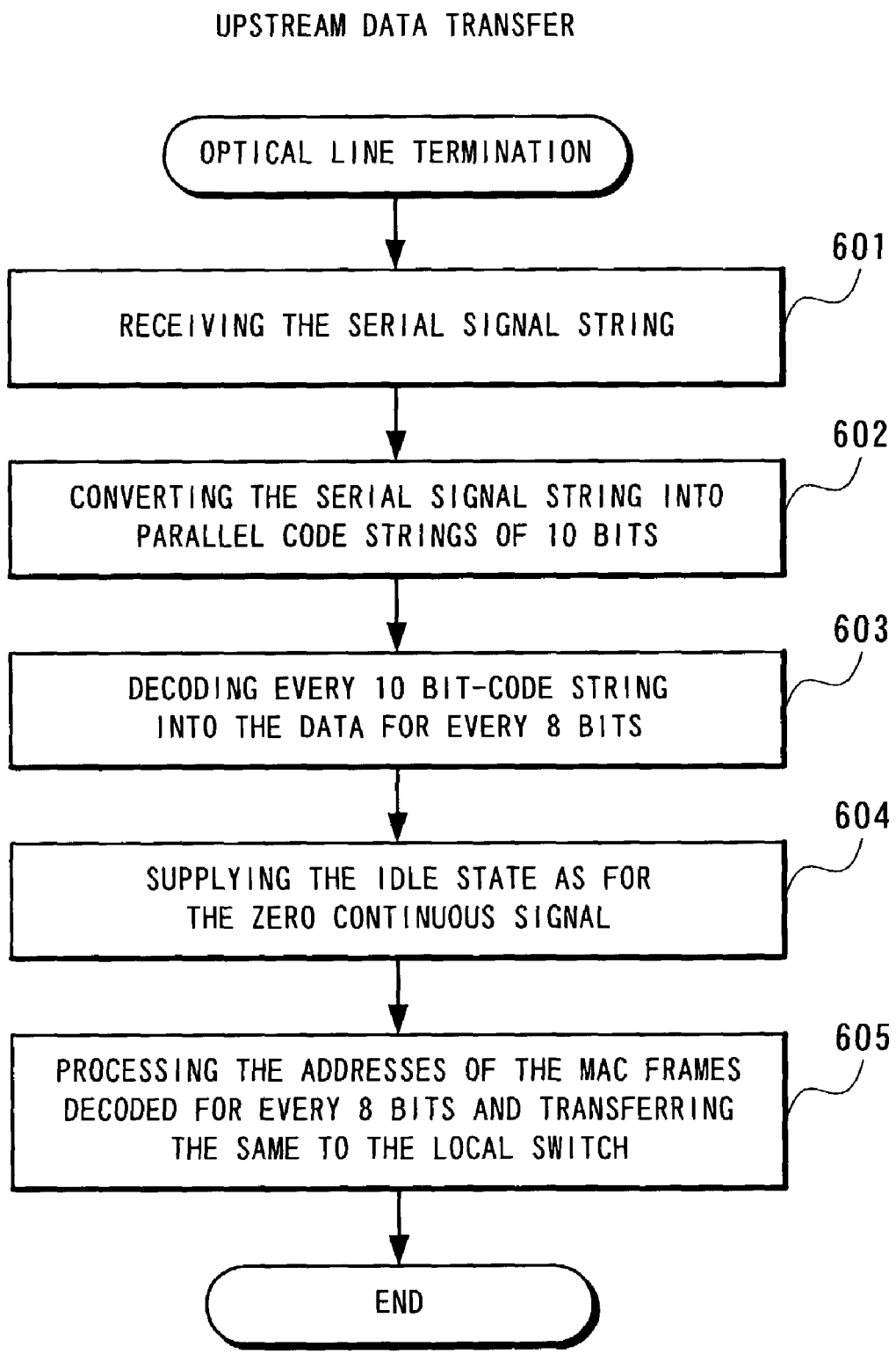
FIG. 6 is a flow chart for use in describing the processing of the data transfer of the EPON system according to the first embodiment, and especially the operation of the optical line termination in the upstream data transfer.

The data transfer (from the respective optical network units 410 to 412 to the optical line termination 420) in the upstream direction according to the first embodiment will be described by using FIG. 1 to FIG. 6. FIG. 5 and FIG. 6 are flow charts for use in describing the data transfer processing from the respective optical network units 410 to 412 to the optical line termination 420.

The MAC controlling unit 124 of the optical line termination 420 determines each frame transmission permissible period for the optical network units 410 to 412, with reference to the situation of the frame arrival at the MAC processing unit 123, and notifies the determined frame transmission permissible periods to the extended MAC controlling unit 414 through a control signal 241 (the control signal 241 is actually transmitted on the fibers 140 to 142 and 240).

As the method of determining the frame transmission permissible periods for the respective optical network units 410 to 412, there can be a method of fixedly assigning the above according to a predetermined policy, a method of dynamically assigning the above depending on the arrival situation of the frames (traffic situation) at the MAC processing unit 123, and a method of dynamically assigning the above according to a demand from the respective optical network units 410 to 412. As the notifying means of the control content, for example, the PAUSE frame defined by the IEEE 802.3 can be used.

The extended MAC controlling unit 414 of each optical network unit 410 to 412 directs the MAC processing unit 113 to start and stop the frame transmission permissible period according to the content of the control signal 241 received from the optical line termination 420.

The MAC processing unit 113 of each of the respective optical network units 410 to 412 having received the MAC frames from the respective client devices 150 to 152 processes their addresses and transfers the MAC frames to the extended 8B10B coding unit 401 during the period of receiving the start instruction through the end instruction of the transmission permissible period from the extended MAC controlling unit 414 (Step 501 in FIG. 5).

The extended MAC controlling unit 414 gives the above instructions to the MAC processing unit 113 as well as notifies the extended 8B10B coding unit 401 of the start and end of the transmission permissible period.

The signal string 300 shown in FIG. 3 is a format of the signal string transferred from the MAC processing unit 113 to the extended 8B10B coding unit 401 and it is the same as the signal string 300 having been described in the conventional technique.

The extended 8B10B coding unit 401 that the extended MAC controlling unit 414 has notified of the start and end of the transmission permissible period converts the data for every 8 bits into every 10 bit-code (Step 502), namely, into the 8B10B coding signal as for the received signal string 300, during the period from the start instruction to the end instruction.

During the period of receiving the end instruction through the start instruction, namely, the portion in an idle state (idle signal portion) of the signal string 300 is converted into a signal consisting of continuous zero, a bit pattern of repeating [0000000000 0000000000] (Step 503).

The 8B10B coding unit 115 having been shown so far in FIG. 39 converts the idle portion into the idle signals 271 and 272 having a bit pattern of repeating [0011111010 1010010110] or [0011111010 0110110101].

The signal string 500 shown in FIG. 4 is a signal string to be transferred to the signal serializing unit 116 after coding in the extended 8B10B coding unit 401.

A START signal 360 is added before the 8B10B coding signal 370 obtained by converting the data for every 8 bits into every 10 bit-code, and the idle portion of the signal string 500 is converted into zero continuous signals 510 and 511, the bit pattern of repeating [0000000000 0000000000], by the extended 8B10B coding unit 401.

The extended 8B10B coding unit 401 transfers the coded signal string 500 to the signal serializing unit 116. The signal serializing unit 116 converts the transferred signal string 500 into a serial signal and transfers it to the physical interface 117 (Step 504).

The converted serial signal string is transferred to the optical line termination 420 from the physical interface 117 through the fibers 140 to 142 and the passive signal combining/separating unit 230 and the shared fiber 240 (Step 505).

The serial signal string transferred to the optical line termination 420 is received by the physical interface 127 of the optical line termination 420 and transferred to the signal paralleling unit 126 therefrom (Step 601 in FIG. 6).

The signal paralleling unit 126 of the optical line termination 420 converts the serial signal string into parallel code strings for every 10 bits (Step 602) and transfers them to the extended 8B10B decoding unit 402.

The extended 8B10B decoding unit 402 decodes the parallel code strings for every 10 bits into the data for every 8 bits (Step 603). Here, when receiving the zero continuous signal 510 consisting of codes for 10 bits that is the bit pattern [0000000000] of continuous zero, any signal is not supplied but the idle state is supplied (Step 604).

The MAC frame (code string) decoded into the data for every 8 bits in the extended 8B10B decoding unit 402 is transferred to the MAC processing unit 123. The MAC processing unit 123 processes the addresses of the received MAC frames and transfers them to the local switch 160 (Step 605).

As mentioned above, in the EPON system 400 of this embodiment, since the extended 8B10B coding unit 401 of each optical network unit 410 to 412 converts the idle portion of the received signal into zero continuous signals 510 and 511, no signal will be transmitted during the period other than the frame transmission permissible period for each optical network unit 410 to 412, thereby preventing from signal collision in the passive signal combining/separating unit 230 which the signals from the respective optical network units 410 to 412 are concentrated on.

Figure 7:
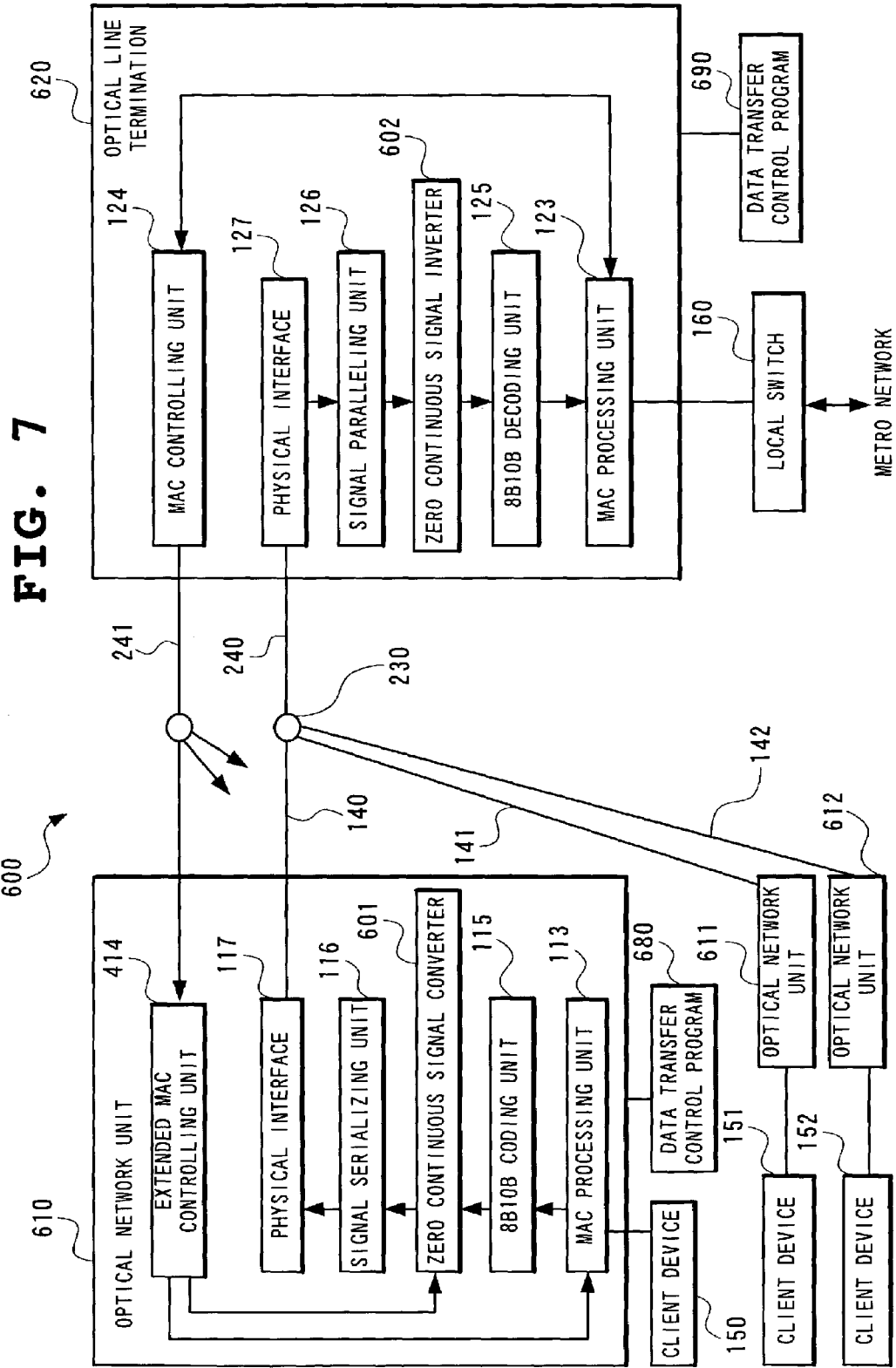
FIG. 7 is a block diagram showing the structure of the EPON system according to a second embodiment of the present invention.

A second embodiment of the present invention will be described by using the drawings. FIG. 7 is a block diagram showing the structure of the EPON system 600, according to the second embodiment of the present invention.

Figure 8:
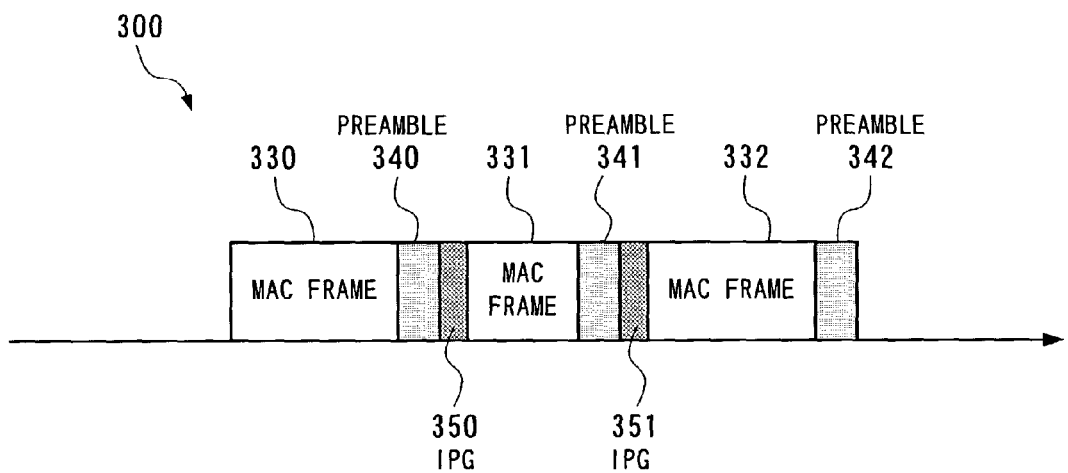
FIG. 8 is a view showing a signal string according to the second embodiment of the present invention.
Figure 9:
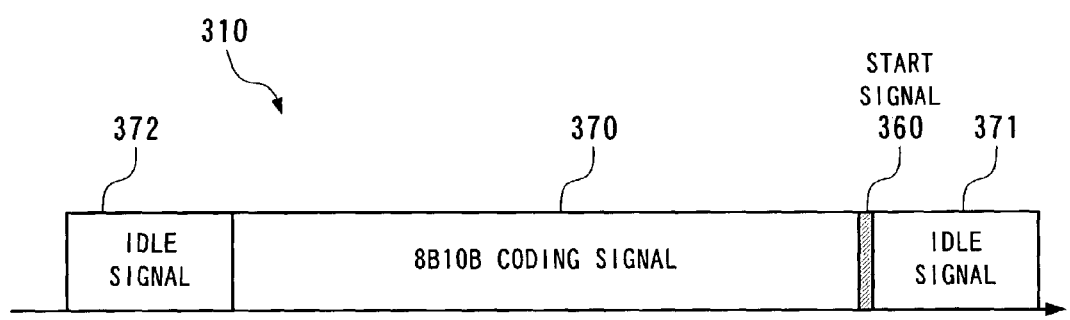
FIG. 9 is a view showing a signal string according to the second embodiment of the present invention.
Figure 10:
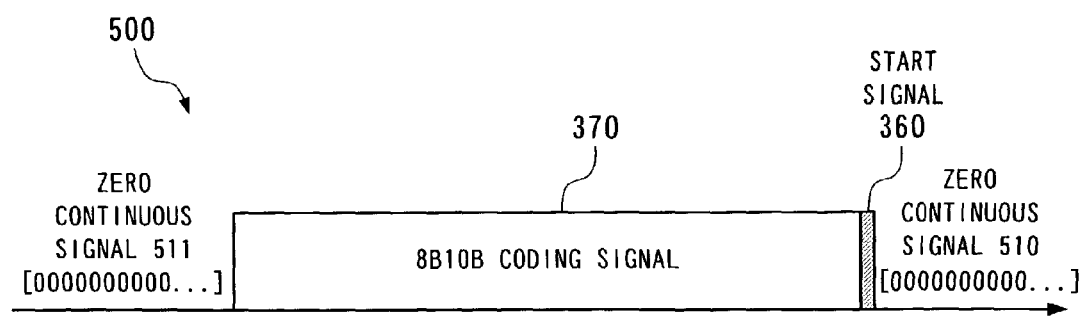
FIG. 10 is a view showing a signal string according to the second embodiment of the present invention.

The EPON system 600 of this embodiment comprises the extended MAC controlling unit 414 and further a zero continuous signal converter 601 in each optical network unit 610 to 612, instead of the MAC controlling unit 114 of each optical network unit 210 to 212 of the conventional EPON system in FIG. 39. A zero continuous signal inverter 602 is further provided in the optical line termination 620, additionally to the structure of the optical line termination 220 of the conventional EPON system 200. FIG. 8, FIG. 9, and FIG. 10 show each signal string between the respective units of the EPON system 600.

Figure 11:
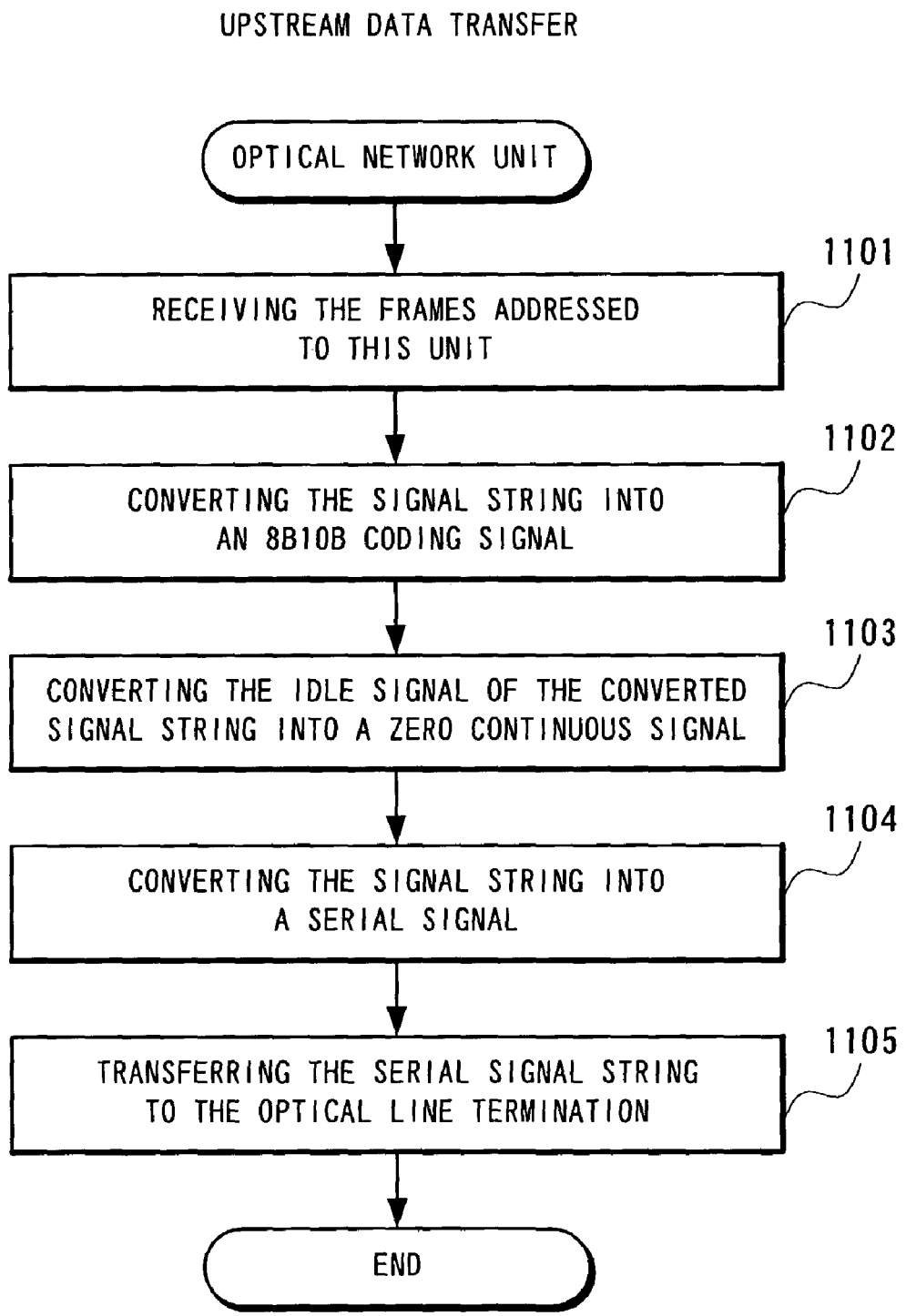
FIG. 11 is a flow chart for use in describing the processing of the data transfer of the EPON system according to the second embodiment, and especially, the operation of the optical network unit in the upstream data transfer.
Figure 12:
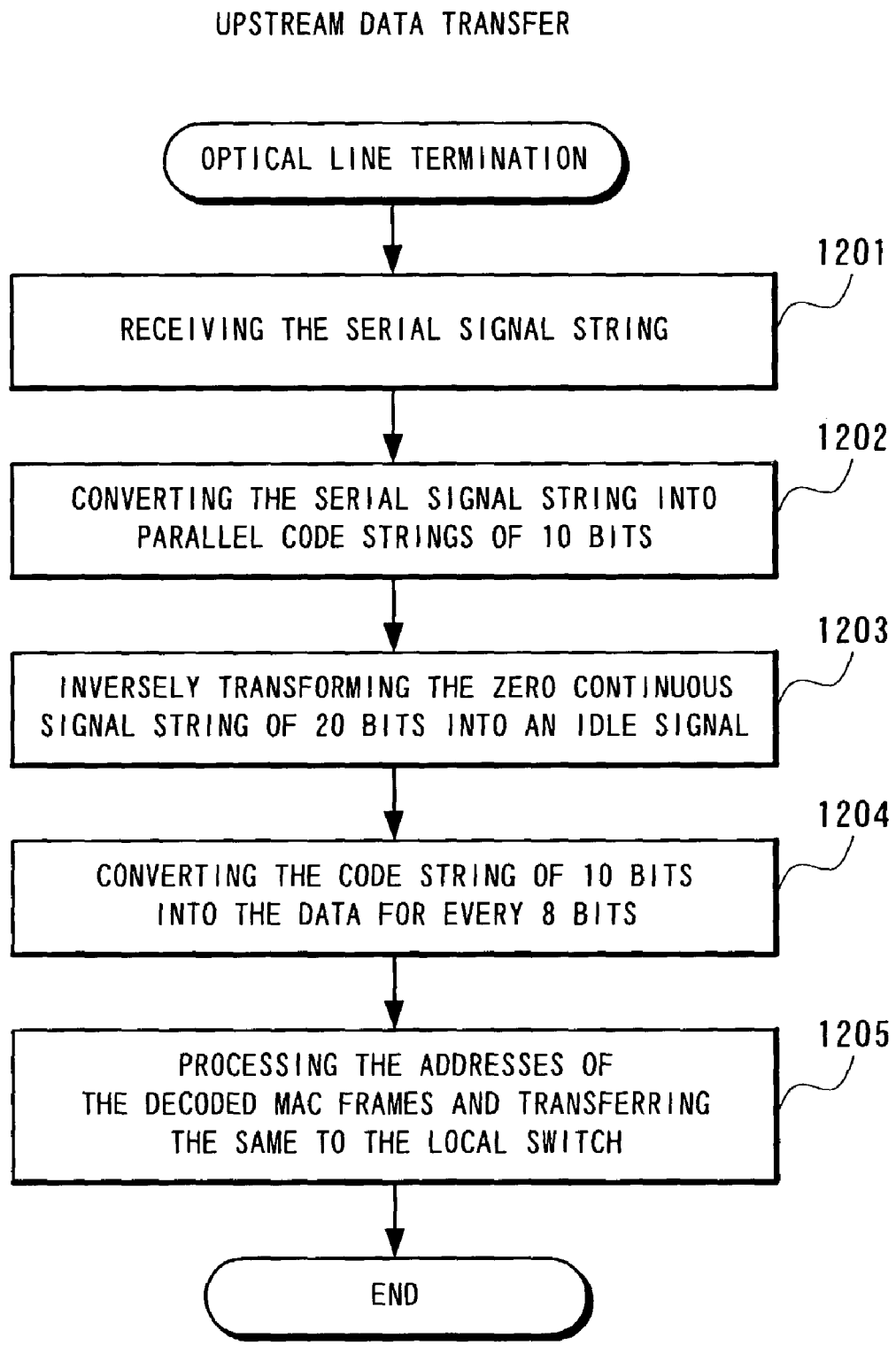
FIG. 12 is a flow chart for use in describing the processing of the data transfer of the EPON system according to the second embodiment, and especially, the operation of the optical line termination in the upstream data transfer.

The data transfer (from the respective optical network units 610 to 612 to the optical line termination 620) in the upstream direction according to the second embodiment will be described by using FIG. 7 to FIG. 12. FIG. 11 and FIG. 12 are flow charts for use in describing the data transfer processing between the respective optical network units 610 to 612 and the optical line termination 620.

The MAC processing unit 113 of each of the respective optical network units 610 to 612 having received the MAC frames from the respective client devices 150 to 152 processes their addresses and transfers the MAC frames to the 8B10B coding unit 115 during the period of receiving the start instruction through the end instruction of the transmission permissible period from the extended MAC controlling unit 414 (Step 1101 in FIG. 11).

The extended MAC controlling unit 414 gives the above instructions to the MAC processing unit 113 and notifies the zero continuous signal converter 601 of the start and end of the transmission permissible period.

The signal string 300 shown in FIG. 8 is a format of the signal string to be transferred from the MAC processing unit 113 to the 8B10B coding unit 115 and it is the same as the signal string 300 having been described in the conventional technique.

The 8B10B coding unit 115 converts the data for every 8 bits into every 10 bit-code as for the received signal string 300 (Step 1102), and transfers the coded signal string to the zero continuous signal converter 601. The signal string 310 shown in FIG. 9 is a format of the signal string to be transferred from the 8B10B coding unit 115 to the zero continuous signal converter 601 and it is the same as the signal string 310 having been described in the conventional technique.

The zero continuous signal converter 601 converts the idle signals 371 and 372 having a bit pattern [0011111010 10010010110] or [0011111010 0110110101] of the received signal string 310 into a zero continuous signal of a bit pattern [0000000000 0000000000] (Step 1103).

It is the period from the end to the start of the transmission permissible period that the idle signals 371 and 372 of the signal string 310 are transferred, and the zero continuous signal converter 601 converts the signal string transferred during that time into a zero continuous signal.

The signal string 500 shown in FIG. 10 is a signal string to be transferred to the signal serializing unit 116, after the zero continuous signal converter 601 converts the idle signals 371 and 372 into the zero continuous signals 510 and 511. As illustrated in FIG. 10, the idle signals 371 and 372 of the signal string 310 are converted into the zero continuous signals 510 and 511 by the zero continuous signal converter 601.

The zero continuous signal converter 601 transfers the coded signal string 500 to the signal serializing unit 116. The signal serializing unit 116 converts the transferred signal string 500 into a serial signal and transfers it to the physical interface 117 (Step 1104).

The converted serial signal string is transferred from the physical interface 117 to the optical line termination 620 through the fibers 140 to 142 and the passive signal combining/separating unit 230 and the shared fiber 240 (Step 1105).

The serial signal string transferred to the optical line termination 620 is received by the physical interface 127 of the optical line termination 620 and therefrom transferred to the signal paralleling unit 126 (Step 1201 in FIG. 12).

The signal paralleling unit 126 of the optical line termination 620 converts the serial signal string into parallel code strings of every 10 bits (Step 1202) and transfers the same to the zero continuous signal inverter 602.

The zero continuous signal inverter 602 inversely transforms the code for every 20 that is a bit pattern [00000000000000000000] of continuous zero of the signal string into the usual idle signals 371 and 372 (Step 1203) and transfers the signal string to the 8B10B decoding unit 125.

The 8B10B decoding unit 125 decodes the code string for every 10 bits into the data for every 8 bits (Step 1204) and transfers the decoded MAC frames to the MAC processing unit 123. The MAC processing unit 123 processes the addresses of the received MAC frames and transfers the same frames to the local switch 160 (Step 1205).

In the above embodiment, the function of the zero continuous signal converter 601 of each optical network unit 610 to 612 can be realized also by the 8B10B coding unit 115. An extended 8B10B decoding unit having the both functions of the zero continuous signal inverter 602 and the 8B10B decoding unit 125 can be provided in the optical line termination 620, hence to have the same effect.

As mentioned above, in the EPON system 600 of this embodiment, since the zero continuous signal converter 601 of each optical network unit 610 to 612 converts the idle portion of the received signal into the zero continuous signals 510 and 511, so as to prevent from the signal transmission during the period other than the frame transmission permissible period for each optical network unit 610 to 612, it is possible to prevent from signal collision in the passive combining/separating unit 230 which the signals from the respective optical network units 610 to 612 are concentrated.

Figure 13:
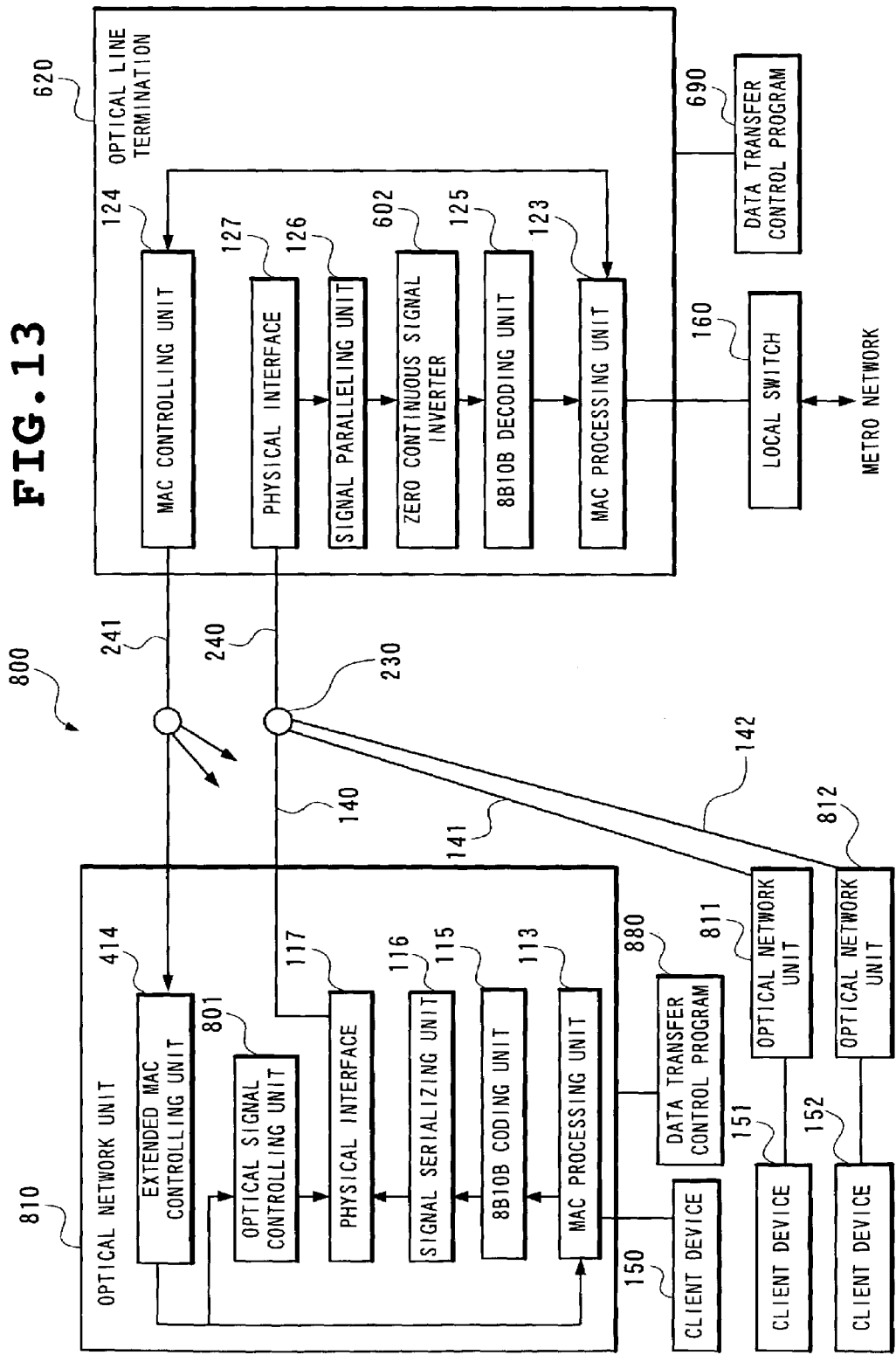
FIG. 13 is a block diagram showing the structure of the EPON system according to a third embodiment of the present invention.

A third embodiment of the present invention will be described by using the drawings. FIG. 13 is a block diagram showing the structure of the EPON system 800 according to the third embodiment of the present invention.

In the EPON system 800 of this embodiment, the extended MAC controlling unit 414 and an optical signal controlling unit 801 are newly provided in each optical network unit 810 to 812, instead of the MAC controlling unit 114 of each optical network unit 210 to 212 of the conventional EPON system 200 in FIG. 39.

The optical signal controlling unit 801 has a function of turning on/off the power source of optical signals of the physical interface 117 according to a control of the extended MAC controlling unit 414. For example, the power source can be realized by a shutter and the like.

Figure 14:
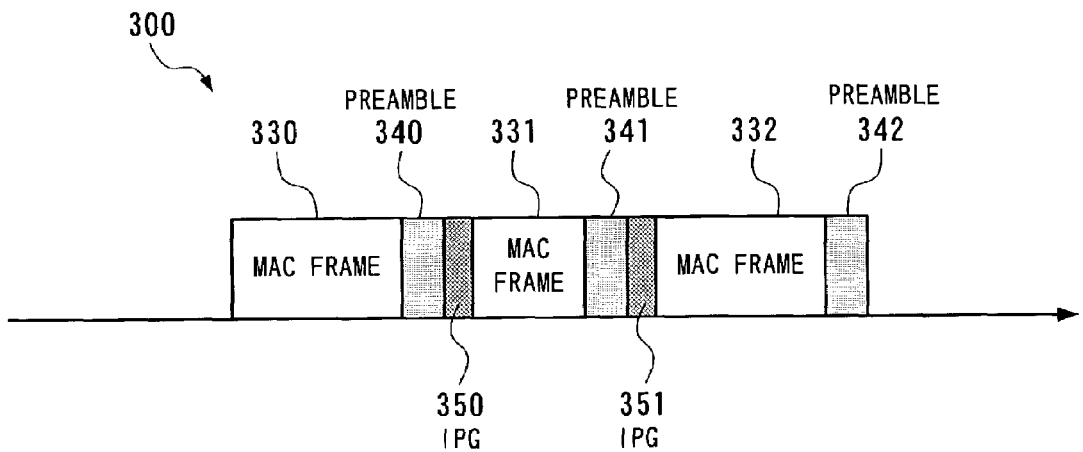
FIG. 14 is a view showing a signal string according to the third embodiment of the present invention.
Figure 15:
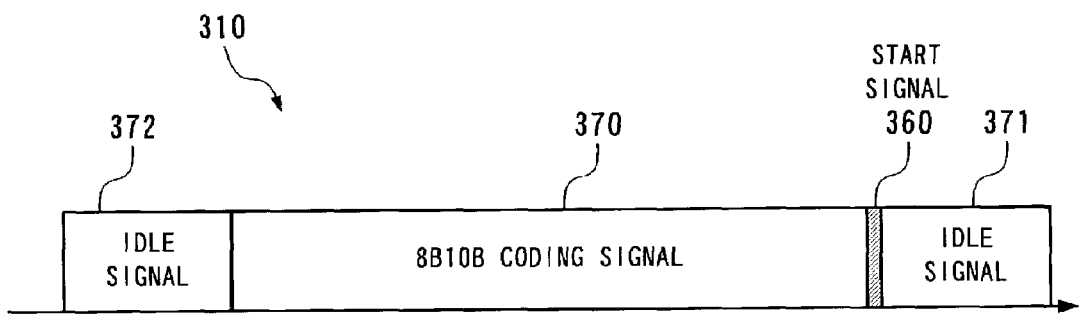
FIG. 15 is a view showing a signal string according to the third embodiment of the present invention.
Figure 16:
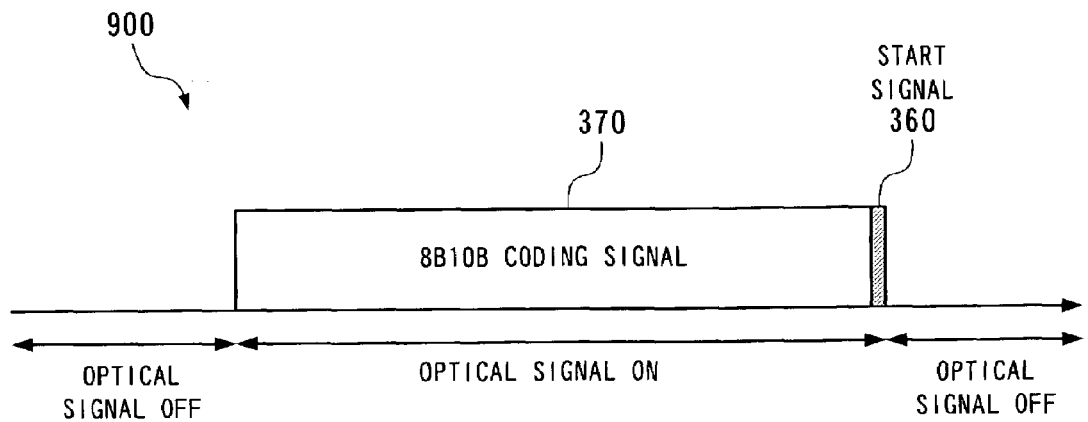
FIG. 16 is a view showing a signal string according to the third embodiment of the present invention.

The zero continuous signal inverter 602 is newly provided in the optical line termination 620, in the same way as the second embodiment, additionally to the structure of the optical line termination 220 of the conventional EPON system in FIG. 39. FIG. 14 to FIG. 16 show each signal string between the respective units of the EPON system 800.

Figure 17:
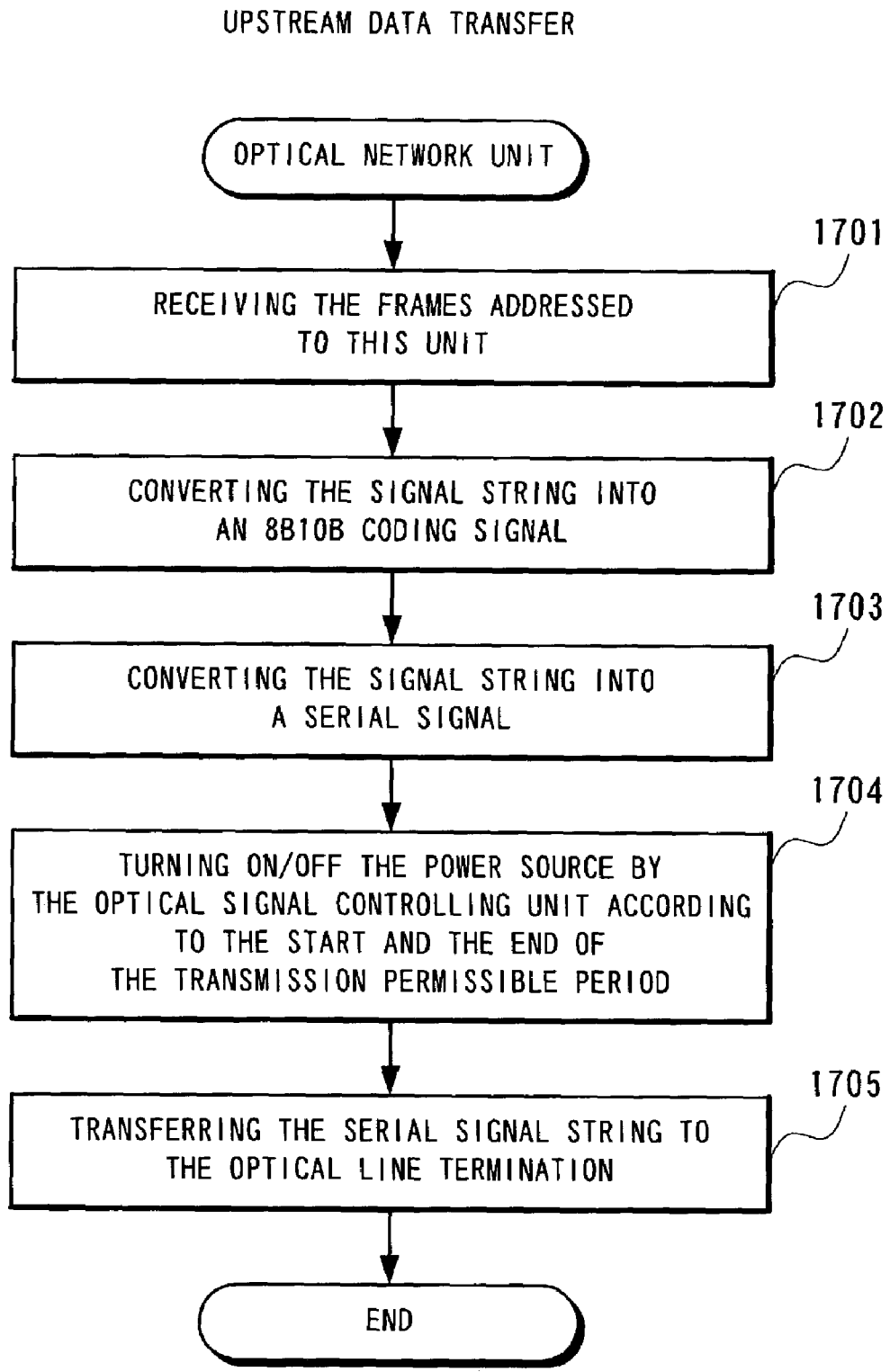
FIG. 17 is a flow chart for use in describing the processing of the data transfer of the EPON system according to the third embodiment, and especially, the operation of the optical network unit in the upstream data transfer.

The data transfer (from the respective optical network units 810 to 812 to the optical line termination 620) in the upstream direction according to the third embodiment will be described by using FIG. 13 to FIG. 17. FIG. 17 is a flow chart for use in describing the data transfer processing of the respective optical network units 810 to 812.

The MAC processing unit 113 of each of the respective optical network units 810 to 812 having received the MAC frames from the respective client devices 150 to 152 processes their addresses and transfers the MAC frames to the 8B10B coding unit 115 during the period of receiving the start instruction through the end instruction of the transmission permissible period from the extended MAC controlling unit 414 (Step 1701 in FIG. 17).

The extended MAC controlling unit 414 gives the above instructions to the MAC processing unit 113 and notifies the optical signal controlling unit 801 of the start and end of the transmission permissible period. The signal string 300 shown in FIG. 14 is a format of the signal string to be transferred from the MAC processing unit 113 to the 8B10B coding unit 115 and it is the same as the signal string 300 having been described in the conventional technique.

The 8B10B coding unit 115 converts the data for every 8 bits into every 10 bit-code as for the received signal string 300 (Step 1702), and transfers the coded signal string to the signal serializing unit 116. The signal string 310 shown in FIG. 15 is a format of the signal string to be transferred from the 8B10B coding unit 115 to the signal serializing unit 116 and it is the same as the signal string 310 having been described in the conventional technique.

The signal serializing unit 116 converts the received signal string 310 of every 10 bits into a serial signal (Step 1703) and transfers it to the physical interface 117. The power source of the physical interface 117 is on/off controlled by the optical signal controlling unit 801.

The optical signal controlling unit 801 turns on/off the power source of the physical interface 117 according to the control signal transferred from the extended MAC controlling unit 414. Upon receipt of a notice of starting the transmission permissible period from the extended MAC controlling unit 414, the optical signal controlling unit 801 turns on the power source of the physical interface 117. While, upon receipt of a notice of finishing the transmission permissible period from the extended MAC controlling unit 414, it turns off the power source of the physical interface 117 (Step 1704).

The signal string 900 shown in FIG. 16 is a signal string to be transferred from the physical interface 117 to the fiber 140. During the period of the power OFF of the physical interface 117 (the period of receiving the end instruction through the start instruction of the transmission permissible period), any signal is not transferred, while during the period of the power ON of the physical interface 117 (the period of receiving the start instruction through the end instruction of the transmission permissible period), a serial signal string of the 8B10B code signal 370 is transferred.

In the case of the power ON, the physical interface 117 transfers the received serial signal string to the fiber 140 (Step 1705). The serial signal string is transferred to the physical interface 127 of the optical line termination 620 through the passive signal combining/separating unit 230 and the shared fiber 240.

The data transfer of the optical line termination 620 is executed in the same processing as that of FIG. 12. The physical interface 127 of the optical line termination 620 transfers the received signal string to the signal paralleling unit 126 (Step 1201). The signal paralleling unit 126 transforms the serial signal string into parallel code strings for every 10 bits (Step 1202) and transfers the same to the zero continuous signal inverter 602.

The zero continuous signal inverter 602 inversely transforms the portion of no data transmission, namely the code of 20 bits that is a zero continuous bit pattern [00000000000000000000] into the idle signals 371 and 372 (Step 1203) and transfers the signal string to the 8B10B decoding unit 125.

The 8B10B decoding unit 125 decodes the code string for every 10 bits into the data for every 8 bits (Step 1204), and transfers the decoded MAC frames to the MAC processing unit 123. The MAC processing unit 123 processes the addresses of the received MAC frames and transfers the same to the local switch 160 (Step 1205).

The optical line termination 620 of this embodiment can be provided with an extended 8B10B decoding unit having the both functions of the zero continuous signal inverter 602 and the 8B10B decoding unit 125, hence to obtain the same effect.

As mentioned above, in the EPON system 800 of this embodiment, since the optical signal controlling unit 801 of each optical network unit 810 to 812 turns on or off the power source of the physical interface 117 according to the instruction from the extended MAC controlling unit 414, so as to prevent from the signal transmission during the period other than the frame transmission permissible period for each optical network unit 810 to 812, it is possible to prevent from signal collision in the passive combining/separating unit 230 which the signals from the respective optical network units 810 to 812 are concentrated on.

Figure 18:
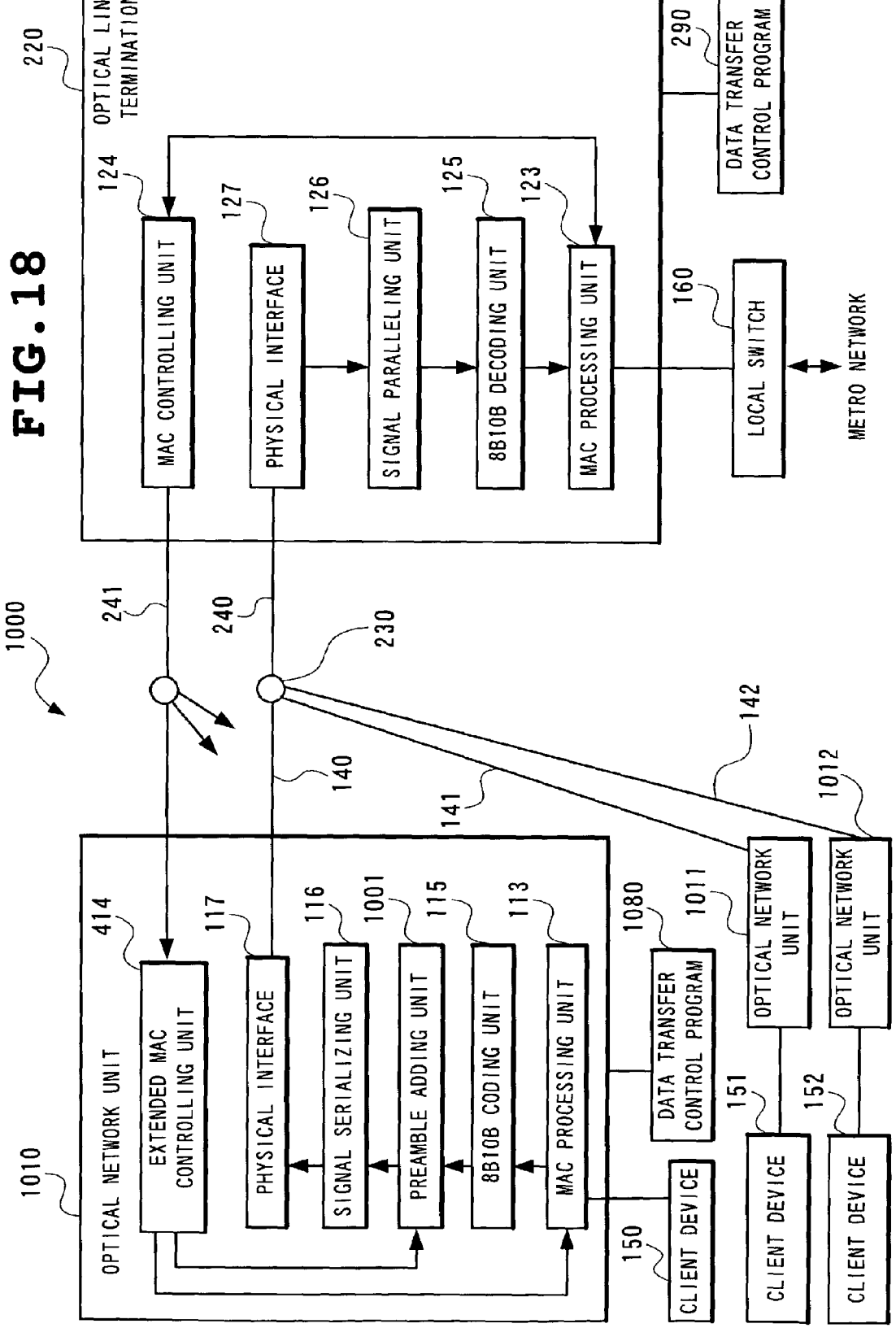
FIG. 18 is a block diagram showing the structure of the EPON system according to a fourth embodiment of the present invention.

A fourth embodiment of the present invention will be described by using the drawings. FIG. 18 is a block diagram showing the structure of the EPON system 1000 of the fourth embodiment of the present invention.

Figure 19:
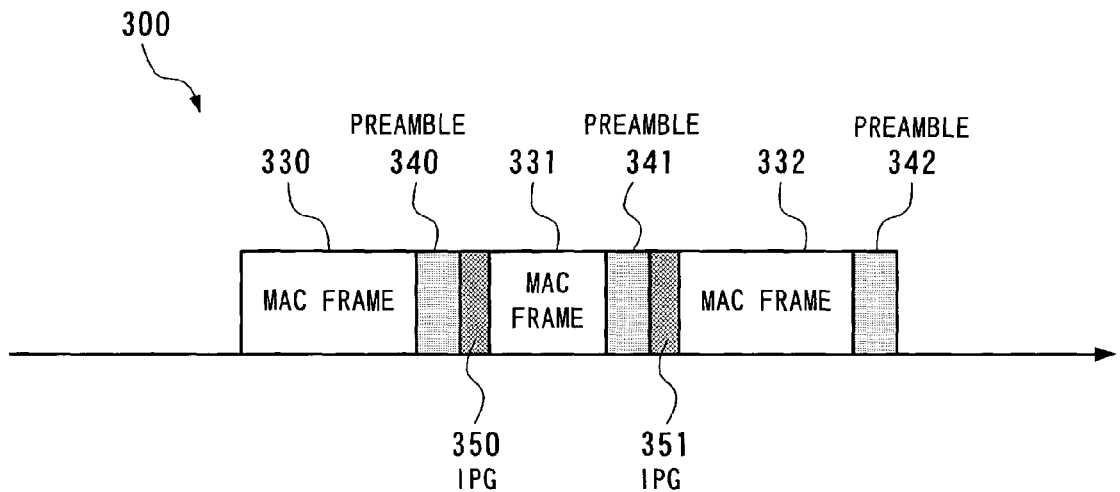
FIG. 19 is a view showing a signal string according to the fourth embodiment of the present invention.
Figure 20:
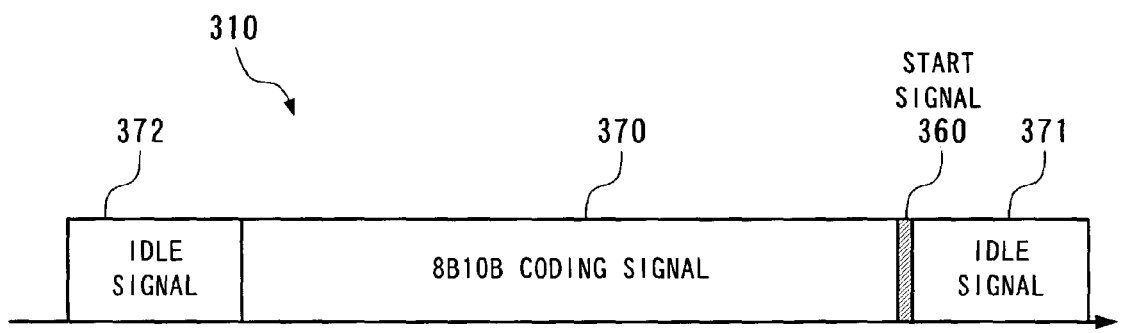
FIG. 20 is a view showing a signal string according to the fourth embodiment of the present invention.
Figure 21:
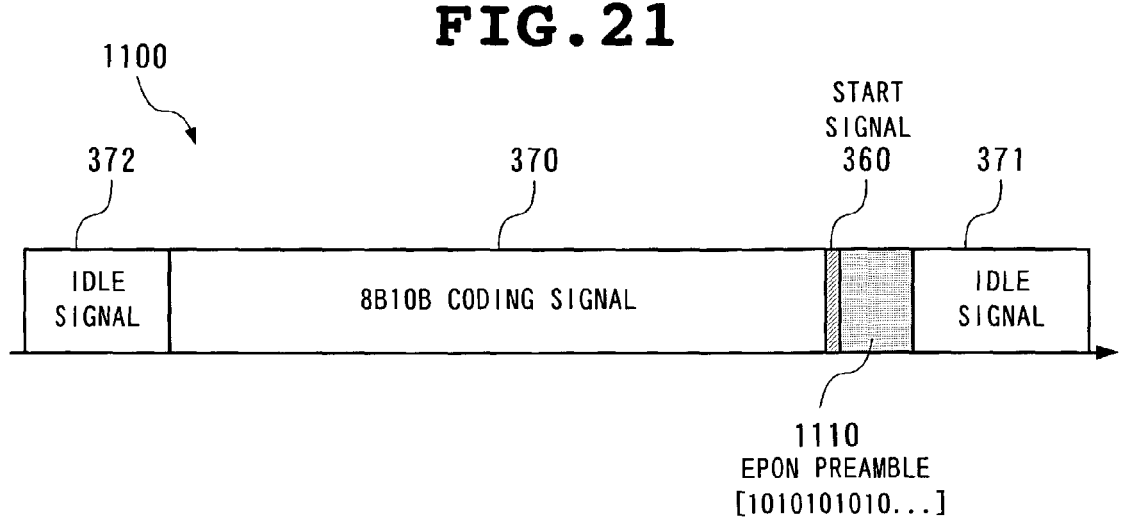
FIG. 21 is a view showing a signal string according to the fourth embodiment of the present invention.

The EPON system 1000 of this embodiment comprises the extended MAC controlling unit 414 and a preamble adding unit 1001 in each optical network unit 1010 to 1012, instead of the MAC controlling unit 114 of each optical network unit 210 to 212 of the conventional EPON system 200 in FIG. 39. FIG. 19 to FIG. 21 show each signal string between the respective units of the EPON system 1000.

Figure 22:
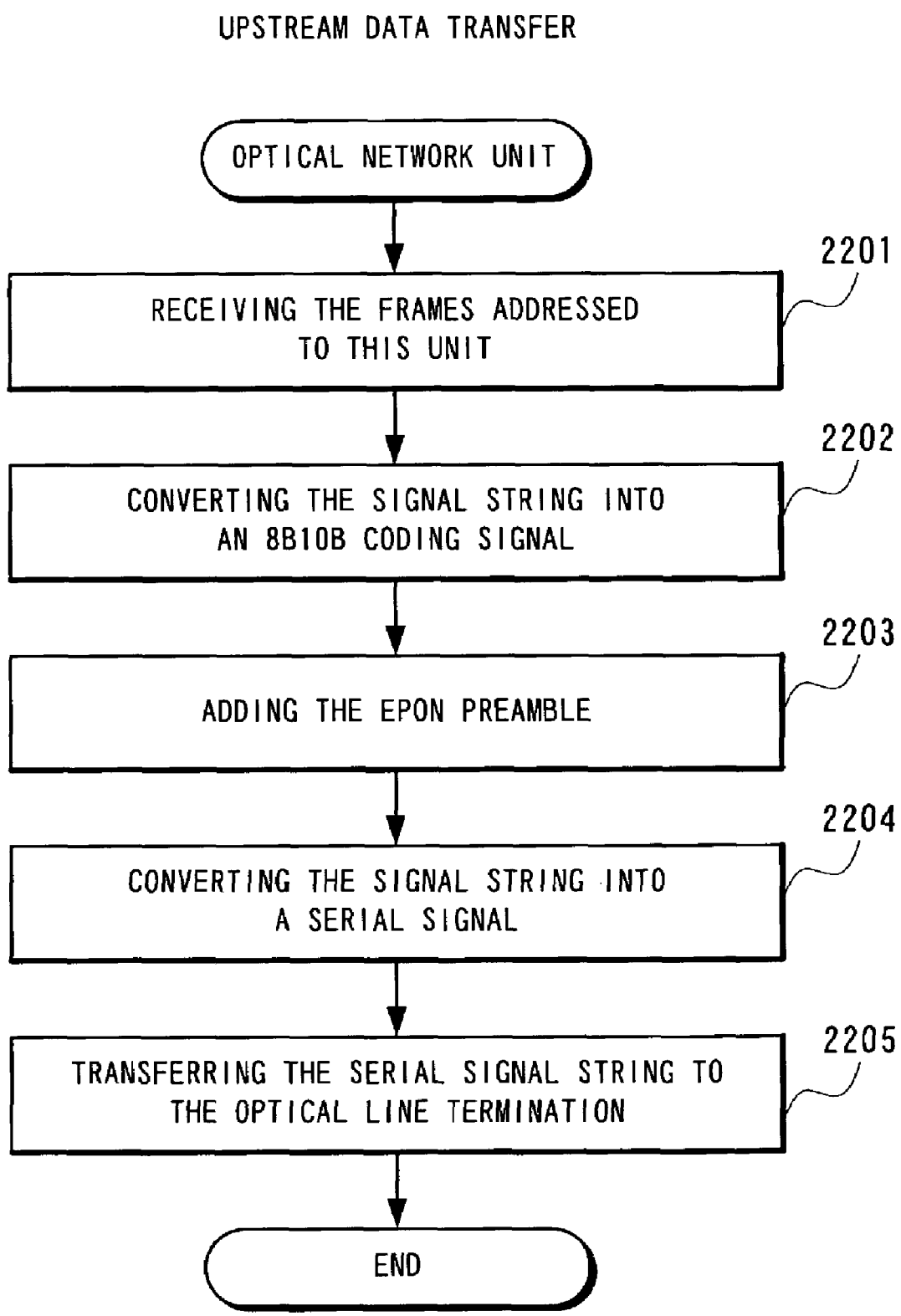
FIG. 22 is a flow chart for use in describing the processing of the data transfer of the EPON system according to the fourth embodiment, and especially, the operation of the optical network unit in the upstream data transfer.
Figure 23:
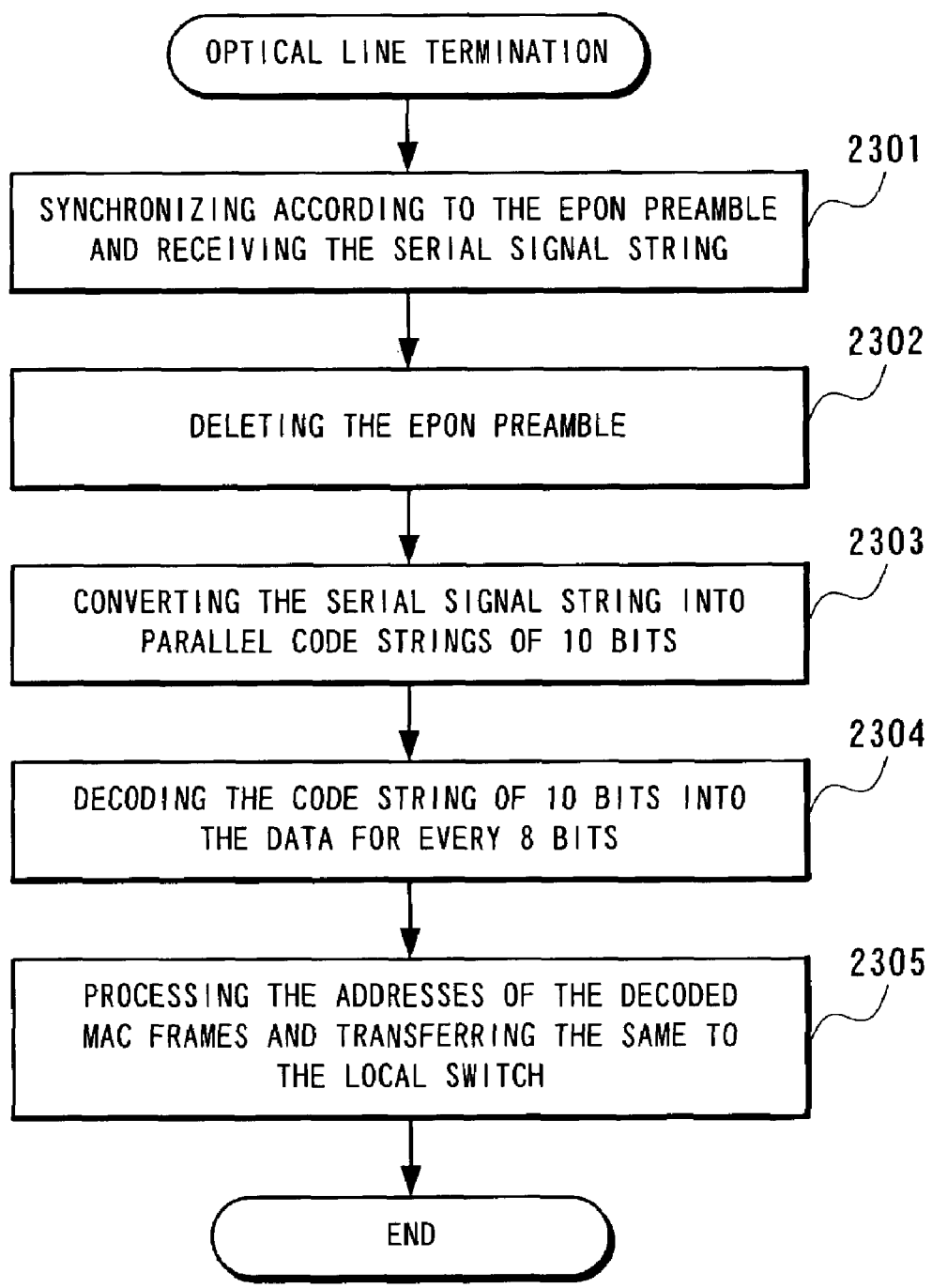
FIG. 23 is a flow chart for use in describing the processing of the data transfer of the EPON system according to the fourth embodiment, and especially, the operation of the optical line termination in the upstream data transfer.

The data transfer (from the respective optical network units 1010 to 1012 to the optical line termination 220) in the upstream direction according to the fourth embodiment will be described by using FIG. 18 to FIG. 23. FIG. 22 and FIG. 23 are flow charts for use in describing the data transfer processing between the respective optical network units 1010 to 1012 and the optical line termination 220.

The MAC processing unit 113 of each of the respective optical network units 1010 to 1012 having received the MAC frames from the respective client devices 150 to 152 processes their addresses and transfers the MAC frames to the 8B10B coding unit 115 during the period of receiving the start instruction through the end instruction of the transmission permissible period from the extended MAC controlling unit 414 (Step 2201 in FIG. 22).

The extended MAC controlling unit 414 gives the above instructions to the MAC processing unit 113 and notifies the preamble adding unit 1001 of the start and end of the transmission permissible period. The signal string 300 shown in FIG. 19 is a format of the signal string to be transferred from the MAC processing unit 113 to the 8B10B coding unit 115 and it is the same as the signal string 300 having been described in the conventional technique.

The 8B10B coding unit 115 converts the data for every 8 bits into every 10 bit-code as for the received signal string 300 (Step 2202), and transfers the 10 bit-code string to the preamble adding unit 1001. The signal string 310 shown in FIG. 20 is a format of the signal string to be transferred from the 8B10B coding unit 115 to the preamble adding unit 1001 and it is the same as the signal string 310 having been described in the conventional technique.

Upon receipt of the signal string 310, the preamble adding unit 1001 that the extended MAC controlling unit 414 notified of the transmission permissible period start adds a bit pattern of [1010101010] repetition to the signal string 310 as the EPON preamble 1110 for synchronization on the side of the optical line termination 220 (Step 2203). The size of the EPON preamble 1110 has to be large enough for the synchronization on the side of the optical line termination 220. The signal string 1100 shown in FIG. 21 is a signal string with the EPON preamble 1110 having been added by the preamble adding unit 1001.

The preamble adding unit 1001 adds the EPON preamble 1110 before the START signal 360 in the received signal string 310. The preamble adding unit 1001 having added the EPON preamble 1110 transfers the signal string 1100 to the signal serializing unit 116. The signal serializing unit 116 converts the transferred signal string 1100 into a serial signal and transfers it to the physical interface 117 (Step 2204).

The converted serial signal string is transferred from the physical interface 117 to the optical line termination 420 through the fibers 140 to 142, the passive signal combining/separating unit 230, and the shared fiber 240 (Step 2205).

The physical interface 127 of the optical line termination 220 obtains a synchronization by receiving the EPON preamble 1110 of the transferred signal string and receives the signal string (Step 2301 in FIG. 23). Thereafter, after deleting the EPON preamble 1110, the signal string is transferred to the signal paralleling unit 126 (Step 2302).

The signal paralleling unit 126 converts the serial signal string into parallel code strings for every 10 bits (Step 2303), and transfers the above to the 8B10B decoding unit 125. The 8B10B decoding unit 125 decodes the parallel code strings for every 10 bits into the data for every 8 bits (Step 2304). The decoded MAC frames are transferred to the MAC processing unit 123. The MAC processing unit 123 processes the addresses of the received MAC frames and transfers the same to the local switch 160 (Step 2305).

As mentioned above, in the EPON system 1000 of this embodiment, since the preamble adding unit 1001 of each optical network unit 1010 to 1012 adds the EPON preamble 1110 at a time of starting the frame transmission, the physical interface 127 of the optical line termination 220 can obtain a synchronization according to the added EPON preamble 1110.

Figure 24:
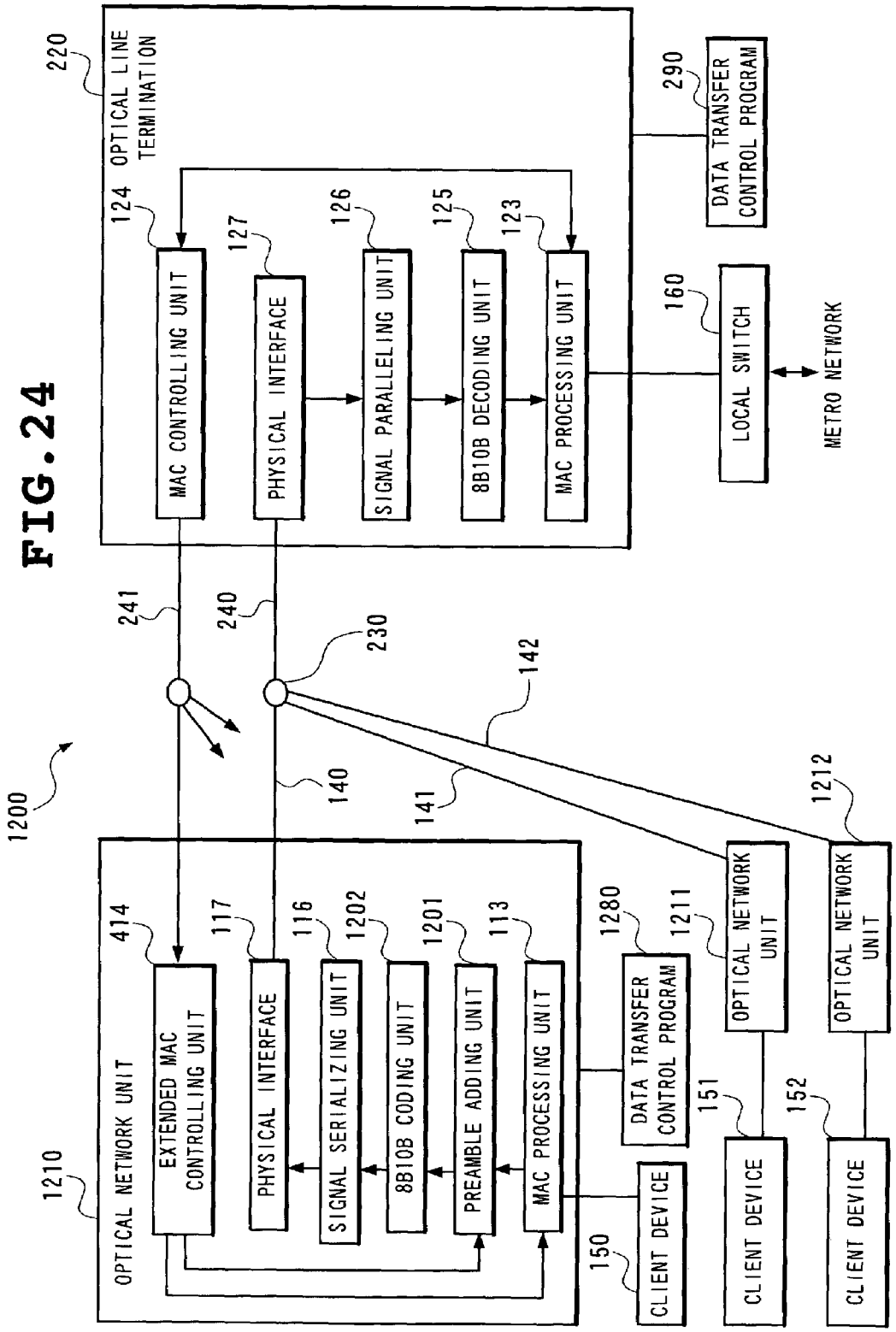
FIG. 24 is a block diagram showing the structure of the EPON system according to a fifth embodiment of the present invention.

A fifth embodiment of the present invention will be described by using the drawings. FIG. 24 is a block diagram showing the structure of the EPON system 1200 of the fifth embodiment of the present invention.

The EPON system 1200 of this embodiment is newly provided with the extended MAC controlling unit 414, the 8B10B coding unit 1202, and the preamble adding unit 1201 in each optical network unit 1210 to 1212, instead of the MAC controlling unit 114 and the 8B10B coding unit 115 of each optical network unit 210 to 212 of the conventional EPON system 200 in FIG. 39. FIG. 25 to FIG. 27 and FIG. 28 to FIG. 31 show each signal string between the respective units of the EPON system 1200.

Figure 30:
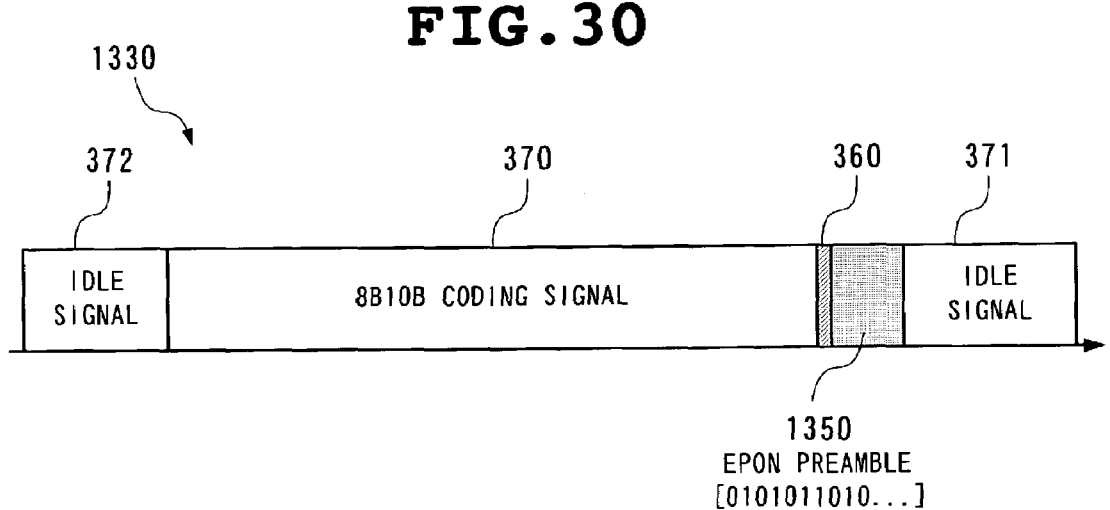
FIG. 30 is a view showing a signal string of the second EPON preamble adding method according to the fifth embodiment of the present invention.
Figure 31:
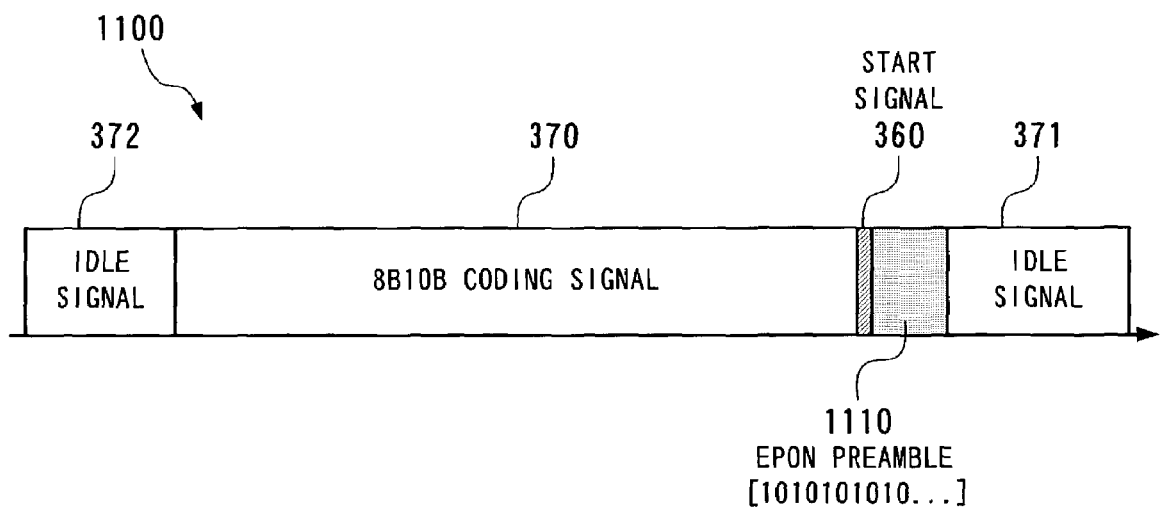
FIG. 31 is a view showing a signal string of the second EPON preamble adding method according to the fifth embodiment of the present invention.
Figure 32:
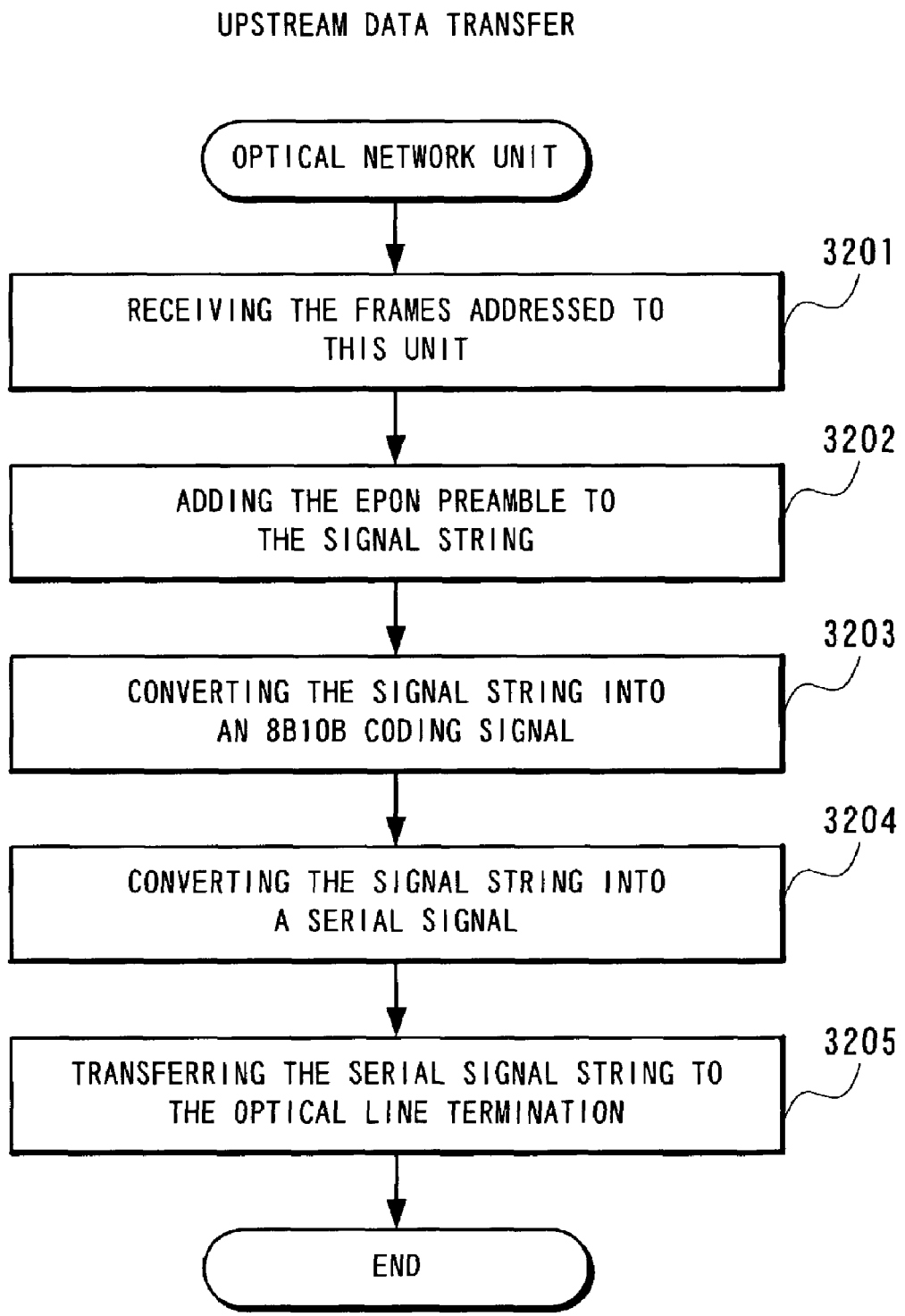
FIG. 32 is a flow chart for use in describing the processing of the data transfer of the EPON system according to the fifth embodiment, and especially the operation of the optical network unit in the upstream data transfer.
Figure 33:
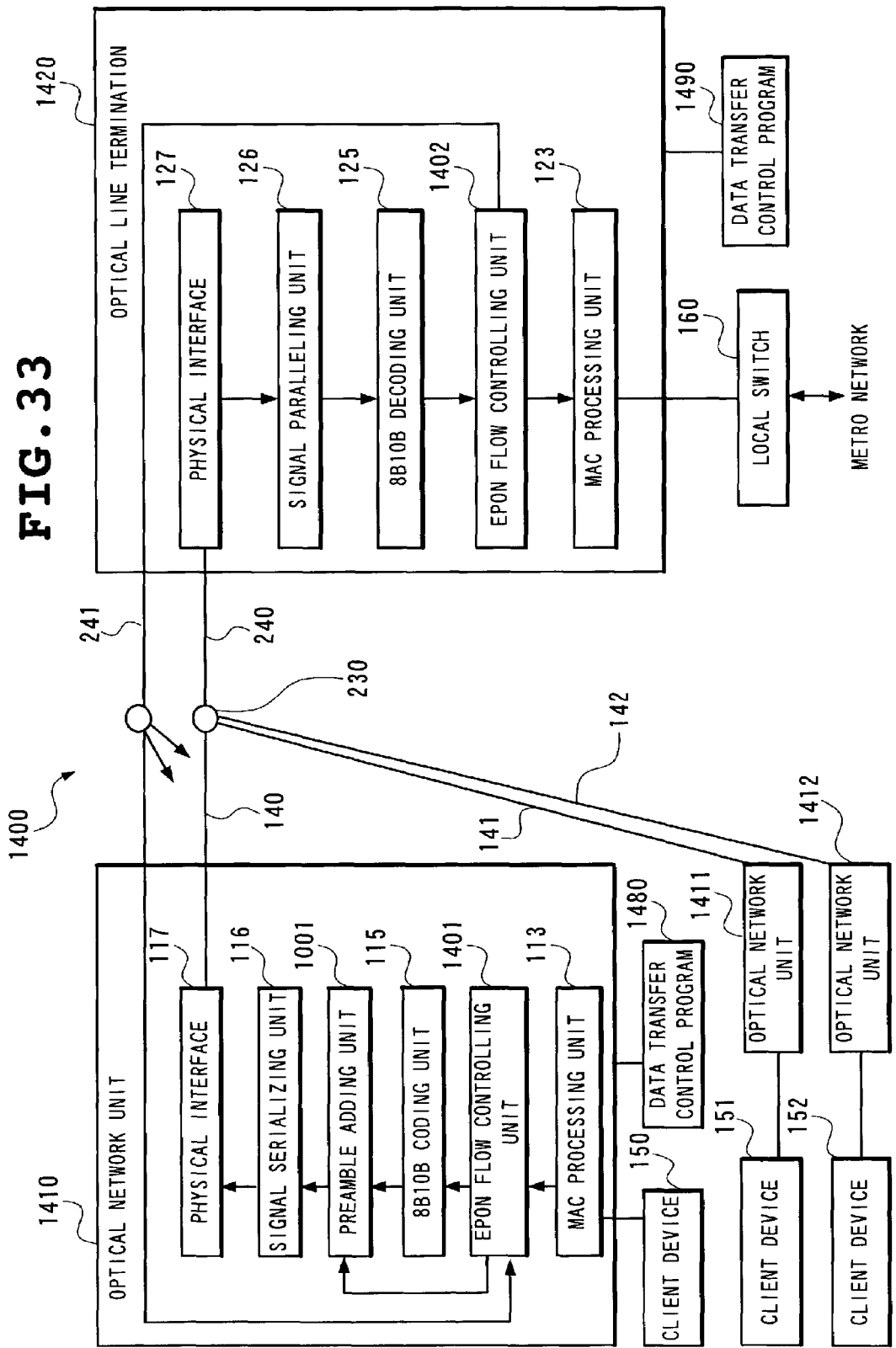
FIG. 33 is a block diagram showing the structure of the EPON system according to a sixth embodiment of the present invention.

The data transfer (from the respective optical network units 1210 to 1212 to the optical line termination 220) in the upstream direction according to the fifth embodiment will be described by using FIG. 24 to FIG. 33. FIG. 32 and FIG. 33 are flow charts for use in describing the data transfer processing between the respective optical network units 1210 to 1212 and the optical line termination 220.

In the EPON system 1200 of this embodiment, there are two ways of adding an EPON preamble in the preamble adding unit 1201 and the 8B10B coding unit 1202, and they are described respectively in FIG. 25 to FIG. 27 and FIG. 28 to FIG. 31.

The MAC processing unit 113 of each of the respective optical network units 1210 to 1212 having received the MAC frames from the respective client devices 150 to 152 processes their addresses and transfers the MAC frames to the preamble adding unit 1201 during the period of receiving the start instruction through the end instruction of the transmission permissible period from the extended MAC controlling unit 414 (Step 3201 in FIG. 32). The extended MAC controlling unit 414 gives the above instructions to the MAC processing unit 113 and notifies the start of the transmission permissible period to the preamble adding unit 1201.

Figure 25:
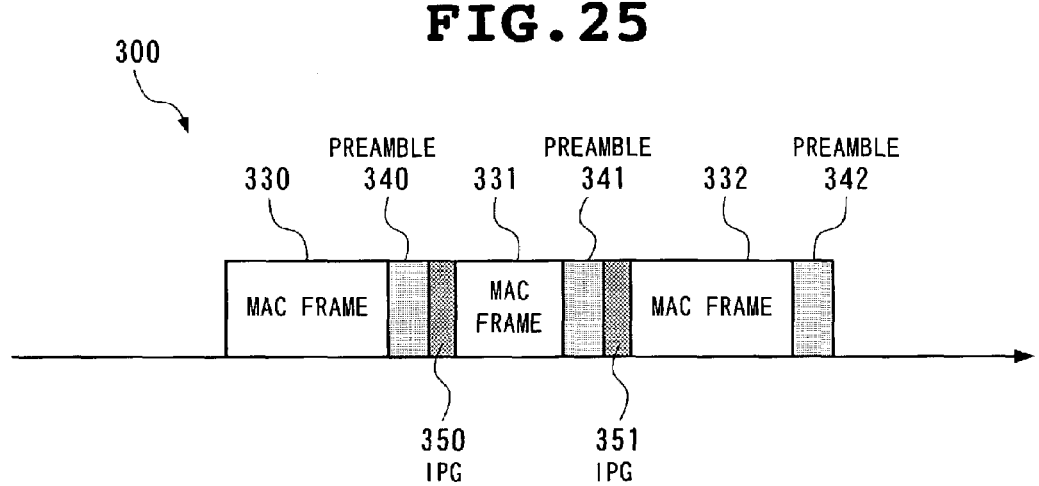
FIG. 25 is a view showing a signal string of a first EPON preamble adding method according to the fifth embodiment of the present invention.

At first, the first preamble adding method will be described with reference to FIG. 25 to FIG. 27. The signal string 300 shown in FIG. 25 is a format of the signal string to be transferred from the MAC processing unit 113 to the preamble adding unit 1201 and it is the same as the signal string 300 having been described in the conventional technique.

Upon receipt of the signal string 300, the preamble adding unit 1201 that the extended MAC controlling unit 414 directed to start the transmission permissible period adds the EPON preamble 1310 for synchronization on the side of the optical line termination 220 to the signal string 300 (Step 3202). The signal string 1300 shown in FIG. 26 is a signal string with the EPON preamble 1310 having been added there by the preamble adding unit 1201.

The preamble adding unit 1201 adds a bit pattern of repeating [10110101] to the received signal string 300 as the EPON preamble 1310.

The bit pattern of repeating [10110101] which is added to the signal string as the EPON preamble 1310 is to be converted into an original bit pattern of repeating [1010101010] necessary for the preamble through the 8B10B coding by the 8B10B coding unit 1202. The preamble adding unit 1201 having added the EPON preamble 1310 transfers the data string 1300 to the 8B10B coding unit 1202.

The 8B10B coding unit 1202 converts the data for every 8 bits into every 10 bit-code as for the received signal string 1300 (Step 3203). Here, as for the EPON preamble 1310, the code string having been coded is positioned before the START signal 360.

Figure 27:
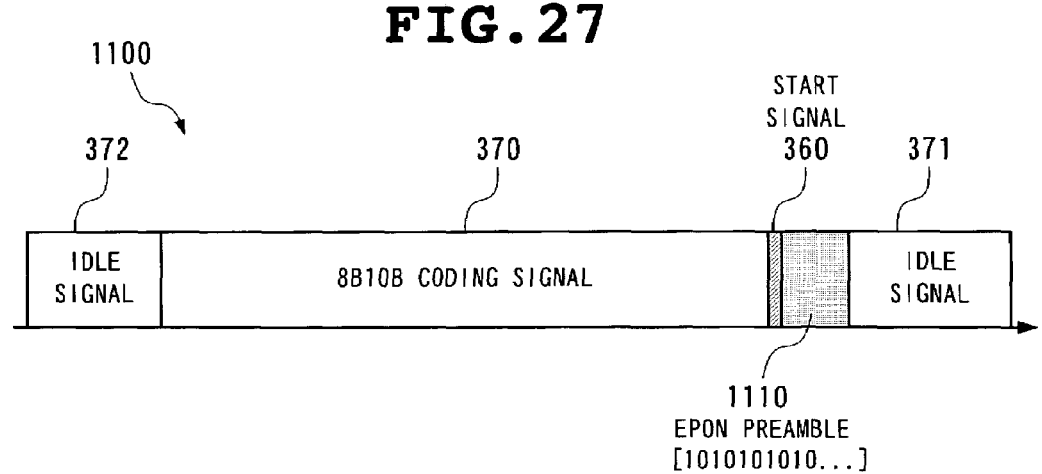
FIG. 27 is a view showing a signal string of the first EPON preamble adding method according to the fifth embodiment of the present invention.
Figure 28:
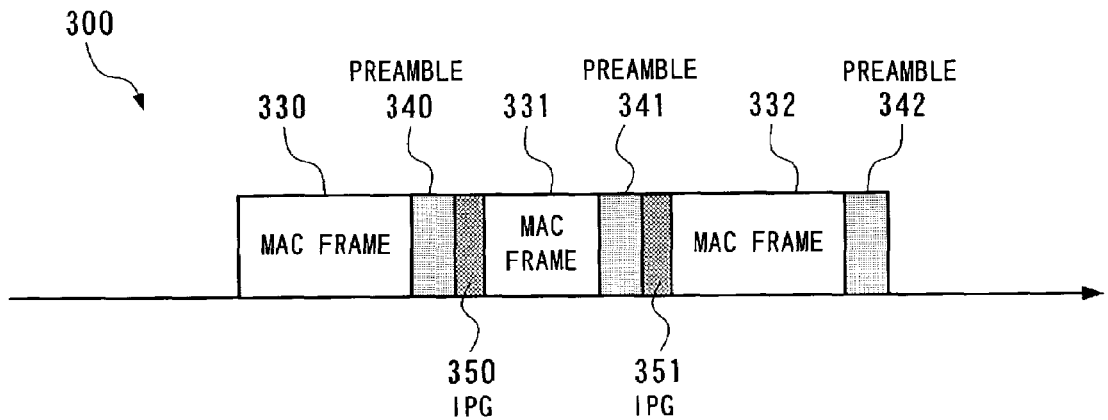
FIG. 28 is a view showing a signal string of a second EPON preamble adding method according to the fifth embodiment of the present invention.

The signal string 1100 shown in FIG. 27 is a signal string to be transferred from the 8B10B coding unit 1202 to the signal serializing unit 116. The EPON preamble 1310 of the signal string 1300 is converted into the EPON preamble 1110 that is a bit pattern of [1010101010] repetition by the 8B10B coding unit 1202 and positioned before the START signal 360. The 8B10B coding unit 1202 transfers the coded signal string 1100 to the signal serializing unit 116.

Figure 29:
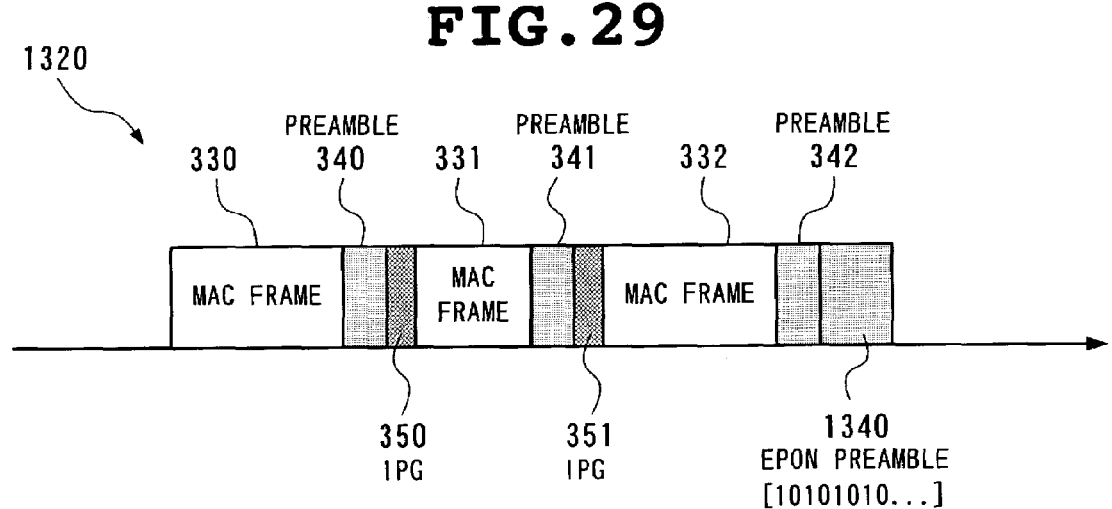
FIG. 29 is a view showing a signal string of the second EPON preamble adding method according to the fifth embodiment of the present invention.

Next, the second preamble adding method will be described with reference to FIG. 28 to FIG. 31. In Step 3202, upon receipt of the signal string 300, the preamble adding unit 1201 that the extended MAC controlling unit 414 directed to start the transmission permissible period adds the original bit pattern of [1010101] repetition necessary for the preamble there as the EPON preamble 1340. The signal string 1320 shown in FIG. 29 is a signal string with the EPON preamble 1340 having added there by the preamble adding unit 1201. The preamble adding unit 1201 having added the EPON preamble 1340 transfers the signal string 1320 to the 8B10B coding unit 1202.

The 8B10B coding unit 1202 converts the data for every 8 bits into every 10 bit-code as for the received signal string 1320 (Step 3203). As for the EPON preamble 1340, the code string having been coded is positioned before the START signal 360. The signal string 1330 shown in FIG. 30 is a signal string which has been 8B10B-coded by the 8B10B coding unit 1202. The EPON preamble 1350 of the signal string 1330 is that one obtained by 8B10B-coding the EPON preamble 1340 of the signal string 1320.

After the 8B10B coding, the 8B10B coding unit 1202 converts the EPON preamble 1350 of the signal string 1330 into the EPON preamble 1110 that is the original bit pattern of [1010101010] repetition necessary for the preamble. The signal string 1100 shown in FIG. 31 is a signal string obtained by converting the EPON preamble 1110. The 8B10B coding unit 1202 transfers the signal string 1100 to the signal serializing unit 116.

The processing thereafter is the same as in Steps 2204 and 2205 in FIG. 22. The processing of the optical line termination 220 having received the serial signal string is executed in the same way as the processing of FIG. 23.

Figure 26:
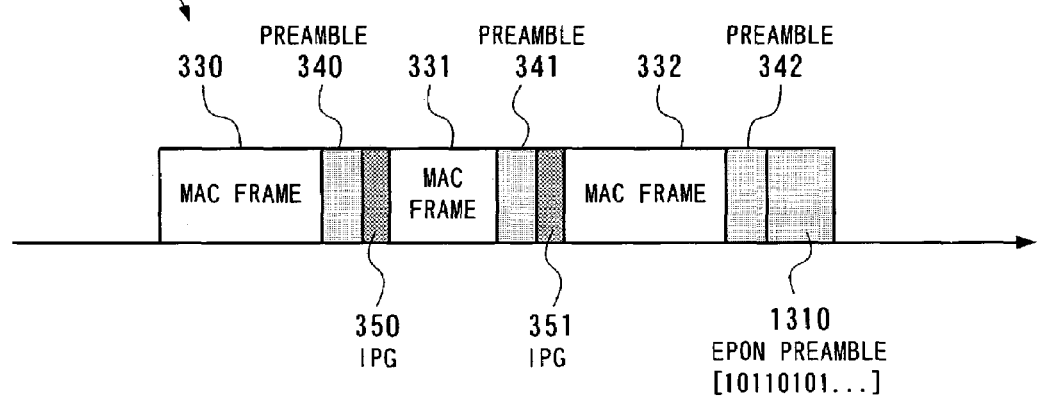
FIG. 26 is a view showing a signal string of the first EPON preamble adding method according to the fifth embodiment of the present invention.

The preamble adding method according to this embodiment is the same as that in the conventional EPON system 200 as for the frame transfer of moving from the signal serializing unit 116 to the local switch 160 through each unit of the optical line termination 220, in either case of the method of FIG. 25 to FIG. 27 and the method of FIG. 28 to FIG. 31.

As mentioned above, in the EPON system 1200 of this embodiment, the preamble adding unit 1201 of each optical network unit 1210 to 1212 adds the EPON preamble 1310 to the signal string at a time of starting the frame transmission, and the 8B10B coding unit 1202 converts the EPON preamble 1310 into the EPON preamble 1110. Therefore, since the EPON preamble for synchronization is not lost through the 8B10B coding, the physical interface 127 of the optical line termination 220 can obtain a synchronization according to the converted EPON preamble 1110.

A sixth embodiment of the present invention will be described by using the drawings. FIG. 33 is a block diagram showing the structure of the EPON system 1400 of the sixth embodiment of the present invention.

Figure 34:
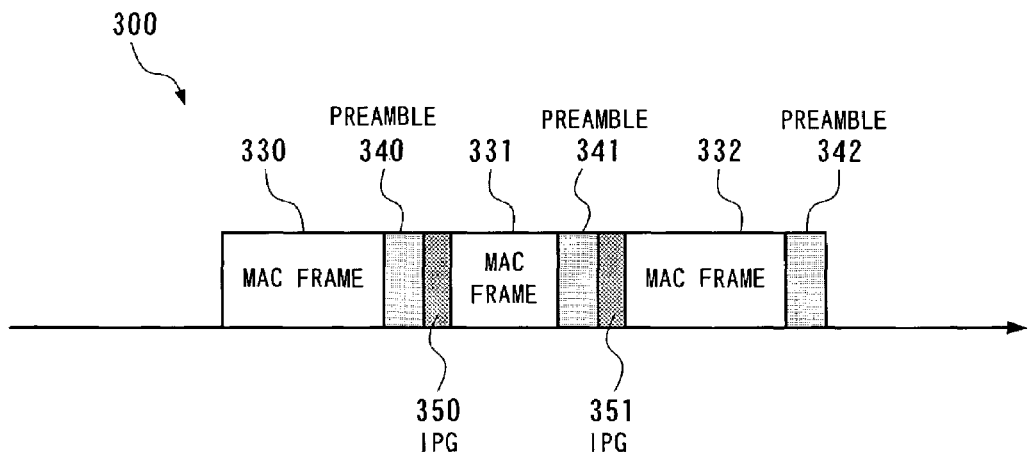
FIG. 34 is a view showing a signal string according to the sixth embodiment of the present invention.
Figure 35:
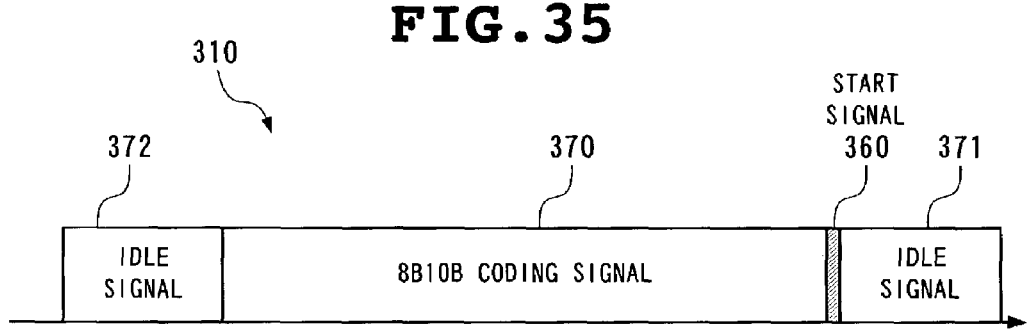
FIG. 35 is a view showing a signal string according to the sixth embodiment of the present invention.
Figure 36:
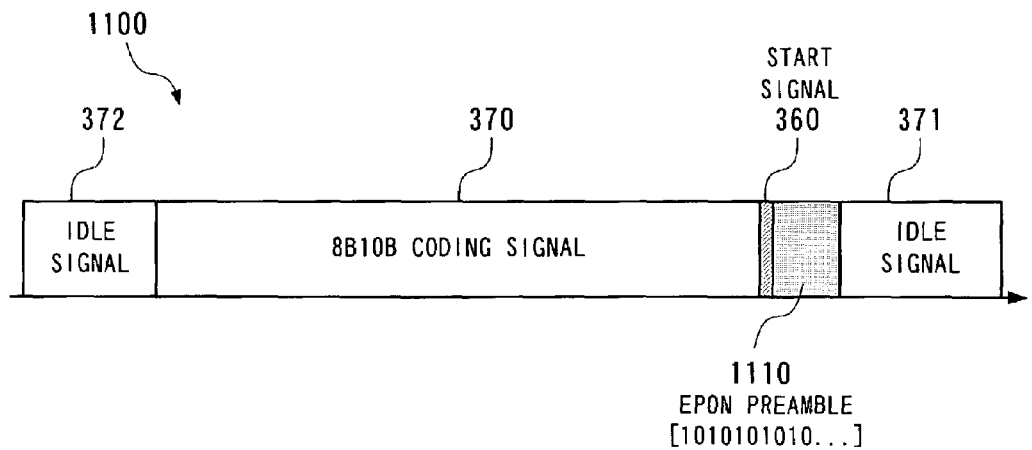
FIG. 36 is a view showing a signal string according to the sixth embodiment of the present invention.

The EPON system 1400 of this embodiment is newly provided with an EPON flow controlling unit 1401 and the preamble adding unit 1001 in each optical network unit 1410 to 1412, instead of the MAC controlling unit 114 of each optical network unit 210 to 212 of the conventional EPON system 200 in FIG. 39. Further, the optical line termination 1420 is newly provided with an EPON flow controlling unit 1402, instead of the MAC controlling unit 124 of the optical line termination 220 of the conventional EPON system 200. FIG. 34, FIG. 35, and FIG. 36 show each signal string between the respective units of the EPON system 1400.

Figure 37:
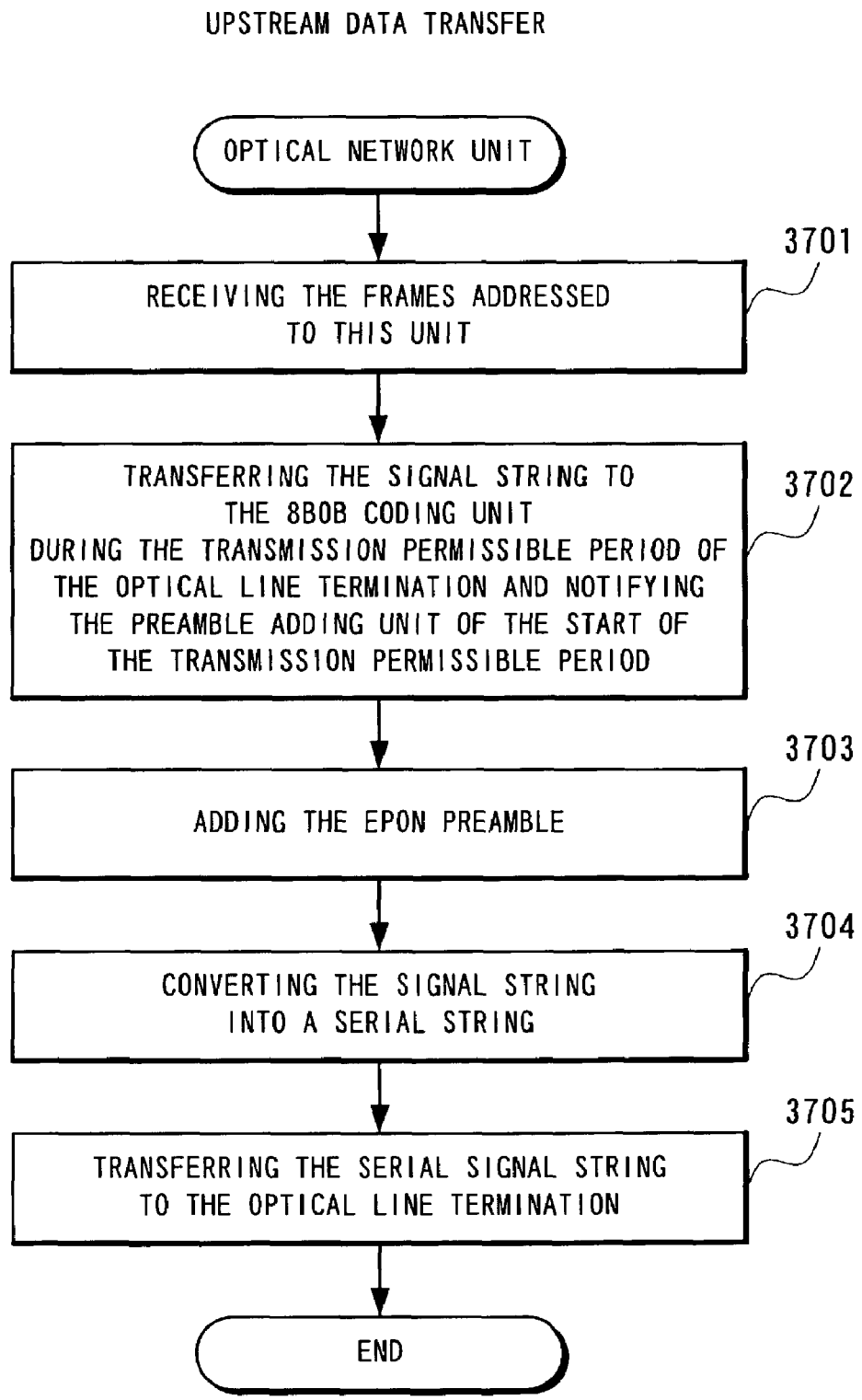
FIG. 37 is a flow chart for use in describing the processing of the data transfer of the EPON system according to the sixth embodiment, and especially the operation of the optical network unit in the upstream data transfer.
Figure 38:
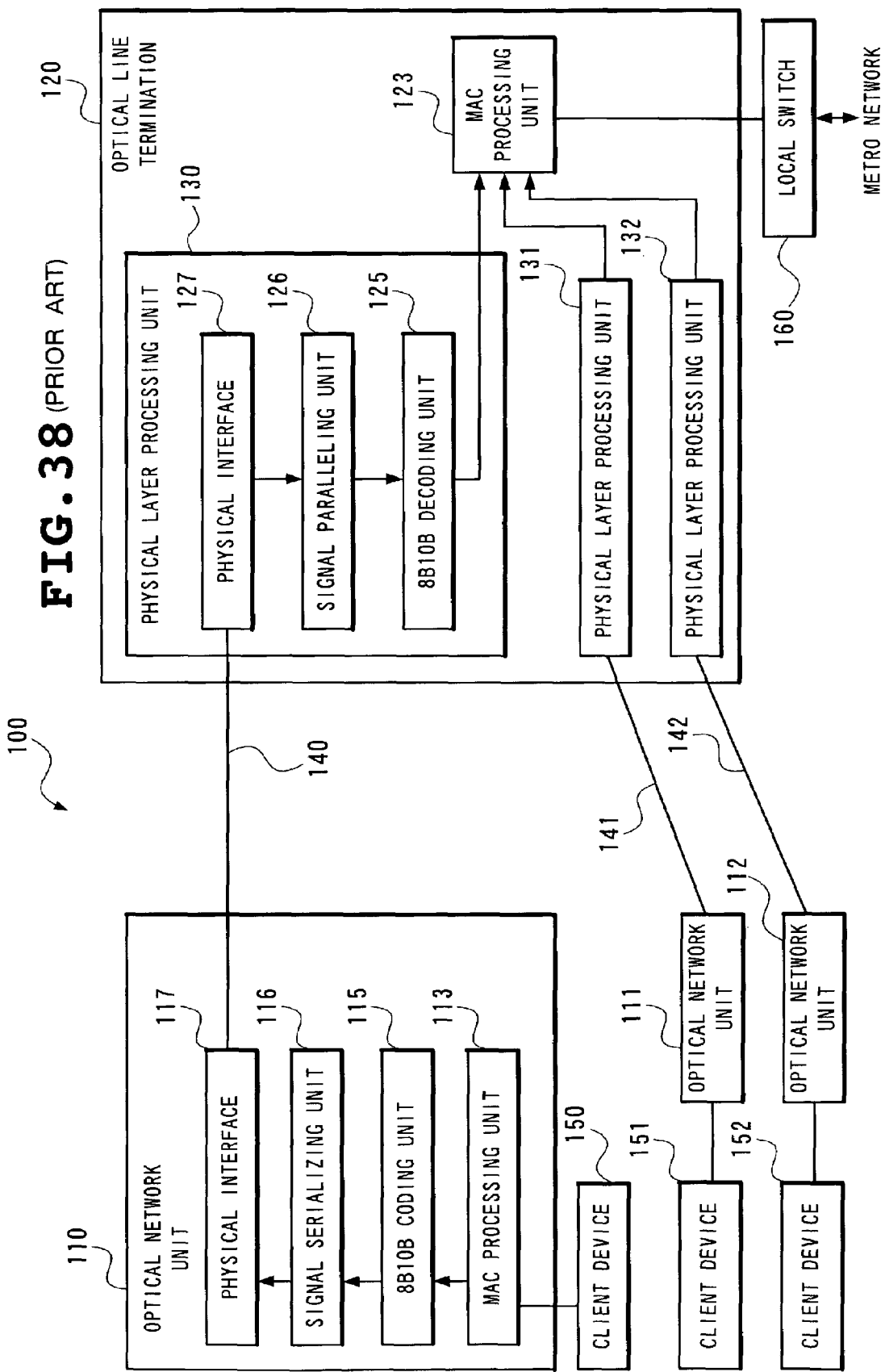
FIG. 38 is a block diagram showing the structure of the conventional E-SS system.

The data transfer (from the respective optical network units 1410 to 1412 to the optical line termination 1420) in the upstream direction according to the sixth embodiment will be described by using FIG. 33 to FIG. 38. FIG. 37 and FIG. 38 are flow charts for use in describing the data transfer processing between the respective optical network units 1410 to 1412 and the optical line termination 1420.

In the EPON system 1400 of this embodiment, the frame transmission in the upstream direction is controlled according to a notice of the control signal from the EPON flow controlling unit 1402 of the optical line termination 1420 to the EPON flow controlling unit 1401 of each optical network unit 1410 to 1412, differently from the EPON system 200 mentioned in the conventional technique.

The EPON flow controlling unit 1402 of the optical line termination 1420 of this embodiment assigns the frame transmission permissible period to each optical network unit 1410 to 1412, according to a monitor for frame transfer state from each optical network unit 1410 to 1412, and notifies the EPON flow controlling unit 1401 of each optical network unit 1410 to 1412 of the start and end of the transmission permissible period according to the control signal 241. The EPON flow controlling unit 1401 starts or stops the transmission of the MAC frames according to the received control information.

The data transfer method in the EPON system 1400 performing the above frame transfer control will be described.

The MAC processing unit 113 of each of the respective optical network units 1410 to 1412 having received the MAC frames from the respective client devices 150 to 152 processes their addresses and transfers the MAC frames to the EPON flow controlling unit 1401 (Step 3701 in FIG. 37). The signal string 300 shown in FIG. 34 is a signal string to be transferred from the MAC processing unit 113 to the EPON flow controlling unit 1401 and it is the same as the signal string 300 having been described in the conventional technique.

The EPON flow controlling unit 1401 temporarily stores the MAC frames of the received signal string 300 and transfers the signal string 300 to the 8B10B coding unit 115 during the period of receiving the start instruction through the end instruction of the transmission permissible period from the EPON flow controlling unit 1402 of the optical line termination 1420. The EPON flow controlling unit 1401 gives the above instructions to the MAC processing unit 113 and notifies the start of the transmission permissible period to the preamble adding unit 1001 (Step 3702).

The MAC processing unit 113 and the EPON flow controlling unit 1401 may be operated as follows in some case.

The MAC controlling unit 113 processes the addresses of the received MAC frames and temporarily stores them. The frame transfer follows the instruction from the EPON flow controlling unit 1401. Upon receipt of the start instruction of the transmission permissible period form the EPON flow controlling unit 1402 of the optical line termination 1420, the EPON flow controlling unit 1401 permits the frame transmission to the MAC processing unit 113. The MAC processing unit 113 that the frame transmission has been permitted transfers the stored MAC frames to the EPON flow controlling unit 1401.

While, the EPON flow controlling unit 1401 applies backpressure to the MAC processing unit 113 to stop the frame transmission, upon receipt of the end instruction of the transmission permissible period from the EPON flow controlling unit 1402 of the optical line termination 1420. The MAC processing unit 113 controlled to stop the frame transmission continuously accumulates the MAC frames. Upon receipt of the MAC frame (signal string 300) from the MAC processing unit 113, the EPON flow controlling unit 1401 transfers the received signal string 300 to the 8B10B coding unit 115.

In any case, the 8B10B coding unit 115 converts the data for every 8 bits into every 10 bit-code, as for the received signal string 300, and transfers the 10 bit-code string to the preamble adding unit 1001. The signal string 310 shown in FIG. 35 is a signal string to be transferred from the 8B10B coding unit 115 to the preamble adding unit 1001 and it is the same as the signal string 310 having been described in the conventional technique.

Upon receipt of the signal string 310, the preamble adding unit 1001 that the EPON flow controlling unit 1401 directed to start the transmission permissible period adds the bit pattern of [1010101010] repetition that is the original preamble to the signal string 310 (Step 3703), as the EPON preamble 1110 for synchronization on the side of the optical line termination 1420. The signal string 1100 shown in FIG. 36 is a format of the signal string with the EPON preamble 1110 having added there by the preamble adding unit 1001, and the EPON preamble 1110 is added before the START signal 360 of the signal string 310.

The preamble adding unit 1001 having added the EPON preamble 1110 transfers the signal string 1100 to the signal serializing unit 116. The signal serializing unit 116 converts the transferred signal string 1100 into a serial signal and transfers it to the physical interface 117 (Step 3704).

The converted serial signal string is transferred from the physical interface 117 to the optical line termination 1420 through the fibers 140 to 142, the passive signal combining/separating unit 230, and the shared fiber 240 (Step 3705).

The physical interface 127 of the optical line termination 1420 establishes a synchronization by receiving the EPON preamble 1110 of the transferred signal string, so to receive the signal string, and thereafter, after deleting the EPON preamble 1110, transfers the signal string to the signal paralleling unit 126. The signal paralleling unit 126 converts the serial signal string into parallel code strings for every 10 bits, and the 8B10B decoding unit 125 decodes the parallel code strings for every 10 bits into the data for every 8 bits and the decoded MAC frames are transferred to the MAC processing unit 123. The MAC processing unit 123 processes the addresses of the received MAC frames and transfers them to the local switch 160. This processing is the same as the processing of FIG. 23.

As mentioned above, in the EPON system 1400 of this embodiment, since the preamble adding unit 1001 of each optical network unit 1410 to 1412 adds the EPON preamble 1110 at a time of starting the frame transmission, so as not to lose the EPON preamble for synchronization through the 8B10B coding, the physical interface 127 of the optical line termination 1420 can establish a synchronization according to the added EPON preamble 1110.

Of the respective embodiments mentioned above, the first to the third embodiments are concerned about the invention for solving the first object of preventing collision of the signals from the respective optical network units in the passive signal combining/separating unit 230, while the fourth to the sixth embodiments are concerned about the invention for solving the second object for obtaining a synchronization on the side of the optical line termination.

It is possible to provide the EPON system capable of solving the first and the second objects by combining one of the first to the third embodiments with one of the fourth to the sixth embodiments.

The upstream frame control can be realized by the extended MAC controlling unit 414 and the MAC controlling unit 124 in the first to the fifth embodiments, while it can be realized by the EPON flow controlling units 1401 and 1402 in the sixth embodiment.

Here, the EPON flow controlling units 1401 and 1402 can be also used for the upstream frame control in the first to the fifth embodiments, similarly to the sixth embodiment.

In this case, the EPON system of performing the upstream frame control by the EPON flow controlling units 1401 and 1402 can solve the first object of preventing the collision of the signals from the respective optical network units in the passive signal combining/separating unit and the second object for obtaining a synchronization on the side of the optical line termination.

Needless to say, the EPON system of the respective embodiments can realize the respective functions of the extended 8B10B coding unit, the extended 8B10B decoding unit, the extended MAC controlling unit, and the optical signal controlling unit, and the other functions in each optical network unit and the optical line termination, by hardware. Further, the data transfer control programs 290, 480, 490, 680, 690, 880, 1080, 1280, 1480, and 1490 that are computer programs having the respective functions may be loaded into a memory of a computer, thereby realizing the above EPON system. These data transfer control programs 290, 480, 490, 680, 690, 880, 1080, 1280, 1480, and 1490 are stored in a magnetic disk, a semiconductor memory, and the other storing medium. They are loaded into the computer from the storing medium, so as to control the operations of the computer, thereby realizing the above-mentioned functions.

As set forth hereinabove, although the invention has been described by taking the preferred embodiments by way of example, the present invention is not restricted to the above embodiments but various modifications are possible within the scope and the sprit of the present invention.

As mentioned above, according to the communication system of the present invention, the communication terminal, the server, and the data transfer control program, the following effects can be achieved.

At first, it is possible to prevent from signal collision from the respective communication terminals in the passive signal combining/separating unit, hence to receive the correct signals in the server.

Namely, in the present invention, the extended 8B10B coding unit or the zero continuous signal converter provided in each communication terminal converts the signal string transferred during the period other than the transmission permissible period into a signal string having a bit pattern of zero continuous signal, alternatively, the optical signal controlling unit turns off the power source of the optical signal. In these ways, when each communication terminal transmits the frames during only the transmission permissible period, signal collision can be prevented in the passive signal combining/separating unit, hence to receive the correct signals in the server.

At second, a server (optical line termination) can synchronize the signals from the respective communication terminals (optical network units) for a short while, thereby realizing the efficient communication.

Namely, in the present invention, the preamble adding unit provided in each communication station adds a code string for preamble to the transferred signal string, and as a result, the bit pattern for the EPON preamble for synchronization is added to the signal string having been 8B10B-coded. Upon receipt of this signal string, the server can synchronize the signals for a short while, by receiving the EPON preamble including the above bit pattern.

In these ways, the present invention can provide a communication system of the Ethernet (R)-PON method in which a server can receive the signals from the respective communication terminals correctly and synchronize the above signals for a short while, the same communication terminal, the same server, and the same data transfer control program.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A communication system comprising:
   a plurality of communication terminals sequentially transferring data to a server during a transmission permissible period assigned to said communication terminals, and the server;
   wherein;
   at least one of said communication terminals includes a converter to convert predetermined first sets of bits in a data frame, each first set consisting of a first number of bits, into second sets of bits, each second set consisting of a second different number of bits, and a transmitter portion to transmit the second sets of bits to said server, during said transmission permissible period, and transmits a repeated bit string of a specified bit to said server, during a period other than said transmission permissible period, and
   said server includes a decoder to obtain said data frame, by inversely transforming said second sets of bits, after inversely transforming said repeated bit string included in said data received from said at least one communication terminal into a special code string indicating a predetermined idle state of zero signal.

2. The communication system, as set forth in claim 1, wherein said first set is 8 bits long and said second set is 10 bits long, and said special code string is a bit string of "0011111010" and "1010010110".

3. The communication system, as set forth in claim 1, wherein said first set is 8 bits long and said second set is 10 bits long, and said special code string is a bit string of "0011111010" and "0110110101".

4. The communication system, as set forth in claim 1, wherein said at least one communication terminal further includes a preamble adding unit to add a preamble for synchronization to a head of a signal string obtained by conversion of said data frame, at a time of starting said transmission permissible period, said server further including a synchronization unit for establishing a synchronization by reading the preamble for synchronization.

5. The communication system, as set forth in claim 4, wherein said at least one communication terminal further includes a preamble adding unit to add a second preamble for creating said preamble for synchronization through said conversion of said data frame before said conversion, at a time of starting said transmission permissible period, codes a signal string by placing the preamble for synchronization obtained by converting the second preamble before a code indicating a head of a frame obtained by converting said data frame, and transmits said coded signal string to said server, said server further including a synchronization unit for establishing a synchronization by reading said preamble for synchronization.

6. The communication system, as set forth in claim 5, wherein said second preamble includes a bit string of repeating "10110101".

7. The communication system, as set forth in claim 4, wherein said at least one communication terminal further includes a preamble adding unit to add a fourth preamble for synchronization to said data frame before said conversion, at a time of starting said transmission permissible period, codes a signal string by placing a third preamble obtained by converting said fourth preamble for synchronization before a code indicating a head of a frame obtained by converting said data frame, and transmits said coded signal string to said server after converting said third preamble into said preamble for synchronization, said server further including a synchronization unit for establishing a synchronization by reading said preamble for synchronization.

8. The communication system, as set forth in claim 4, wherein said preamble for synchronization includes a bit string of repeating "1010101010".

9. The communication system, as set forth in claim 1, wherein said server transmits a control signal for instructing a stop of data transfer to said at least one communication terminal, according to said transmission permissible periods respectively assigned to said at least one communication terminal.

10. The communication system, as set forth in claim 1, wherein said server transmits a control signal for instructing a start of data transfer to said at least one communication terminal, according to said transmission permissible period assigned to said at least one communication terminal.

11. The communication system, as set forth in claim 1, wherein data is transferred between said at least one communication terminal and said server, by using an Ethernet (R) frame.

12. A communication system comprising:
a plurality of communication terminals sequentially transferring data to a server during transmission permissible periods assigned to said communication terminals, and the server;
wherein
at least one of said communication terminals includes a converter to convert predetermined first sets of bits in a data frame, each first set consisting of a first number of bits, into second sets of bits, each second set consisting of a second different number of bits, and a transmitter portion to transmit the second sets of bits to said server, during said transmission permissible period, and turns off a signal for transmitting said data frame, during a period other than said transmission permissible period, and said server includes a decoder to obtain said data frame, by inversely transforming said second sets of bits, after inversely transforming a portion of no data transmission, included in said communication bit string received from said at least one communication terminal, into a predetermined special code string indicating an idle state of zero signal.

13. The communication system, as set forth in claim 12, wherein said first set is 8 bits long and said second set is 10 bits long, and said special code string is a bit string of "0011111010" and "1010010110".

14. The communication system, as set forth in claim 12, wherein said first set is 8 bits long and said second set is 10 bits long, and said special code string is a bit string of "0011111010" and "0110110101".

15. The communication system, as set forth in claim 12, wherein said at least one communication terminal further includes a preamble adding unit to add a preamble for synchronization to a head of a signal string obtained by conversion of said data frame, at a time of starting said transmission permissible period, said server further including a synchronization unit for establishing a synchronization by reading the preamble for synchronization.

16. The communication system, as set forth in claim 15, wherein said at least one communication terminal further includes a preamble adding unit to add a second preamble for creating said preamble for synchronization through said conversion of said data frame before said conversion, at a time of starting said transmission permissible period, codes a signal string by placing the preamble for synchronization obtained by converting the second preamble before a code indicating a head of a frame obtained by converting said data frame, and transmits said coded signal string to said server, said server further including a synchronization unit for establishing a synchronization by reading said preamble for synchronization.

17. The communication system, as set forth in claim 16, wherein said second preamble includes a bit string of repeating "10110101".

18. The communication system, as set forth in claim 15, wherein said at least one communication terminal further includes a preamble adding unit to add a fourth preamble for synchronization to said data frame before said conversion, at a time of starting said transmission permissible period, codes a signal string by placing a third preamble obtained by converting said fourth preamble for synchronization before a code indicating a head of a frame obtained by converting said data frame, and transmits said coded signal string to said server after converting said third preamble into said preamble for synchronization, while said server further including a synchronization unit for establishing a synchronization by reading said preamble for synchronization.

19. The communication system, as set forth in claim 15, wherein said preamble for synchronization includes a bit string of repeating "1010101010".

20. The communication system, as set forth in claim 12, wherein said server transmits a control signal for instructing a stop of data transfer to said at least one respective communication terminal, according to said transmission permissible period assigned to said at least one communication terminal.

21. The communication system, as set forth in claim 12, wherein said server
transmits a control signal for instructing a start of data transfer to said at least one communication terminal, according to said transmission permissible period assigned to said at least one communication terminal.

22. The communication system, as set forth in claim 12, wherein data is transferred between said at least one communication terminal and said server, by using an Ethernet (R) frame.

23. A communication terminal for transferring data to a server during an assigned transmission permissible period, comprising means for converting predetermined first sets of bits in a data frame, each first set consisting of a first number of bits, into second sets of bits, each second set consisting of a second different number of bits, so to transmit the second sets of bits to said server, during said transmission permissible period, and means for transmitting a repeated bit in a string of a specified bit to said server, during a period other than said transmission permissible period,
wherein the server decodes the transmitted string of a specified bit into a special code string indicating a predetermined idle state of zero signal.

24. The communication terminal, as set forth in claim 23, wherein said first set is 8 bits long and said second set is 10 bits long, and said special code string is a bit string of "0011111010" and "1010010110".

25. The communication terminal, as set forth in claim 23, wherein said first set is 8 bits long and said second set is 10 bits long, and said special code string is a bit string of "0011111010" and "0110110101".

26. The communication terminal, as set forth in claim 23, comprising means for temporarily storing said data frame during said transmission permissible period and transmitting the stored data frame to said server within said transmission permissible period.

27. A communication terminal for transferring data to a server during an assigned transmission permissible period, the communication terminal comprising:
- means for converting predetermined first sets of bits in a data frame, each first set consisting of a first number of bits, into second sets of bits, each second set consisting of a second different number of bits, so to transmit the second sets of bits to said sewer, during said transmission permissible period;
- means for transmitting a repeated bit string of a specified bit to said server, during a period other than said transmission permissible period; and
- means for adding a preamble for synchronization on said server to a head of a signal string obtained by converting said data frame, at a time of staffing said transmission permissible period, and transmitting the same signal string to said server.

28. The communication terminal, as set forth in claim 27, comprising:
- means for adding a second preamble for creating said preamble for synchronization through said conversion of said data frame before said conversion, at a time of staffing said transmission permissible period, wherein;
- said conversion means creates a signal string to be transmitted to said server by placing said preamble for synchronization obtained by converting said second preamble before a code indicating a head of a frame obtained by converting said data frame.

29. The communication terminal, as set forth in claim 28, wherein said second preamble includes a bit string of repeating "10110101".

30. The communication terminal, as set forth in claim 27, comprising:
- means for adding a fourth preamble for synchronization to said data frame before said conversion, at a time of staffing said transmission permissible period, means for adding a third preamble obtained by converting said fourth preamble for synchronization before a code indicating a head of a frame obtained by converting said data frame, and creates a signal string to be transmitted to said server, by converting said third preamble into said preamble for synchronization.

31. The communication terminal, as set forth in claim 27, wherein said preamble for synchronization includes a bit string of repeating "1010101010".

32. A server for sequentially receiving data from a plurality of communication terminals during transmission permissible periods assigned to each of said communication terminals, comprising means for receiving a communication bit string obtained by converting predetermined first sets of bits in a data frame, each first set consisting of a first number of bits, into second sets of bits, each second set consisting of a second different number of bits, from at least one of said communication terminals, and means for obtaining said data frame, by inversely transforming said second sets of bits, after inversely transforming a repeated bit in a string of a specified bit included in said received communication bit string into a predetermined special code string indicating an idle state of zero signal.

33. The server, as set forth in claim 32, wherein said first set is 8 bits long and said second set is 10 bits long, and said special code string is a bit string of "0011111010" and "1010010110".

34. The server, as set forth in claim 32, wherein said first set is 8 bits long and said second set is 10 bits long, and said special code string is a bit string of "0011111010" and "0110110101".

35. The server, as set forth in claim 32, which transmits a control signal for instructing a stop of data transfer to each of said at least one communication terminals, according to said transmission permissible period assigned to each of said at least one communication terminals.

36. The server, as set forth in claim 32, which transmits a control signal for instructing a start of data transfer to each of said at least one communication terminals, according to said transmission permissible period assigned to each of said at least one communication terminals.

37. A server for sequentially receiving data from a plurality of communication terminals during transmission permissible periods assigned to each of said communication terminals, said server comprising:
- means for receiving a communication bit string obtained by converting predetermined first sets of bits in a data frame, each first set consisting of a first number of bits, into second sets of bits, each second set consisting of a second different number of bits, from at least one of said communication terminals; and
- means for obtaining said data frame, by inversely transforming said second sets of bits, after inversely transforming a repeated bit string included in said received communication bit string into a predetermined special code string indicating an idle state of zero signal,
- wherein said server fixedly assigns said transmission permissible periods to said at least one communication terminal at each period previously determined in said at least one communication terminal.

38. A server for sequentially receiving data from a plurality of communication terminals during transmission permissible periods assigned to each of said communication terminals, said server comprising:
- means for receiving a communication bit string obtained by converting predetermined first sets of bits in a data frame, each first set consisting of a first number of bits, into second sets of bits, each second set consisting of a second different number of bits, from at least one of said communication terminals; and
- means for obtaining said data frame, by inversely transforming said second sets of bits, after inversely transforming a repeated bit string included in said received communication bit string into a predetermined special code string indicating an idle state of zero signal,
- wherein said server dynamically assigns said transmission permissible periods to said at least one communication terminal, according to arrival status of data transfer from said at least one communication terminal.

39. A server for sequentially receiving data from a plurality of communication terminals during transmission permissible periods assigned to each of said communication terminals, said server comprising:
- means for receiving a communication bit string obtained by converting predetermined first sets of bits in a data frame, each first set consisting of a first number of bits, into second sets of bits, each second set consisting of a second different number of bits, from at least one of said communication terminals; and
- means for obtaining said data frame, by inversely transforming said second sets of bits, after inversely transforming a repeated bit string included in said received communication bit string into a predetermined special code string indicating an idle state of zero signal,
- wherein said server dynamically assigns said transmission permissible periods to said at least one communication terminal, according to assignment requests of said transmission permissible periods transferred from said at least one communication terminal.

40. A computer readable medium storing a data transfer control program for controlling a frame transmission of a communication terminal for transferring data to a server during an assigned transmission permissible period, by controlling a computer, said program, when executed performs functions, comprising: converting predetermined first sets of bits in a data frame, each first set consisting of a first number of bits, into second sets of bits, each second set consisting of a second different number of bits, so to transmit the second sets of bits to said server, during said transmission permissible period; and transmitting a repeated bit in a string of a specified bit to said server, during a period other than said transmission permissible period.

41. A computer readable medium storing a data transfer control program for controlling a frame transmission of a plurality of communication terminals by controlling a server for sequentially receiving data from at least one of said communication terminals during a transmission permissible period assigned to said at least one communication terminal, said program, when executed performs functions comprising: receiving a communication bit string obtained by converting predetermined first sets of bits in a data frame, each first set consisting of a first number of bits, into second sets of bits, each second set consisting of a second different number of bits, from said at least one communication terminal; and obtaining said data frame, by inversely transforming said second sets of bits, after inversely transforming a repeated bit string included in said received communication bit string into a predetermined special code string indicating an idle state of zero signal.

* * * * *